US011742907B2

(12) United States Patent
Sahin et al.

(10) Patent No.: US 11,742,907 B2
(45) Date of Patent: *Aug. 29, 2023

(54) USER GROUPING FOR MULTI-USER MIMO

(71) Applicant: Meta Platforms, Inc., Menlo Park, CA (US)

(72) Inventors: Mustafa Emin Sahin, Porter Ranch, CA (US); Brett Eric Schein, Mountain View, CA (US); Djordje Tujkovic, Los Altos, CA (US); Krishna Srikanth Gomadam, San Jose, CA (US); Po Han Huang, Cypress, TX (US); Praveen Kumar Gopala, Sunnyvale, CA (US); Anoop Singh Tomar, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,954

(22) Filed: Sep. 13, 2022

(65) Prior Publication Data
US 2023/0006717 A1 Jan. 5, 2023

Related U.S. Application Data

(63) Continuation of application No. 17/491,307, filed on Sep. 30, 2021, now Pat. No. 11,476,903.
(Continued)

(51) Int. Cl.
*H04B 7/0452* (2017.01)
*H04L 27/26* (2006.01)
(Continued)

(52) U.S. Cl.
CPC ......... *H04B 7/0452* (2013.01); *H04B 7/0417* (2013.01); *H04B 7/0456* (2013.01);
(Continued)

(58) Field of Classification Search
CPC .. H04B 7/0452; H04B 7/0417; H04B 7/0456; H04B 7/0632; H04B 7/0639;
(Continued)

(56) References Cited

U.S. PATENT DOCUMENTS

2017/0264355 A1 9/2017 Zhang et al.
2020/0389880 A1 12/2020 Lu et al.

OTHER PUBLICATIONS

International Search Report and Written Opinion for International Application No. PCT/US2022/033165, dated Sep. 22, 2022, 9 pages.

(Continued)

*Primary Examiner* — Vineeta S Panwalkar
(74) *Attorney, Agent, or Firm* — Baker Botts L.L.P.

(57) ABSTRACT

In one embodiment, a method includes sending SRS received from a plurality of UEs associated with the base station to a DU associated with the base station, receiving information regarding a subset of the plurality of UEs selected for downlink data transmissions for an RBG, multi-user data to be transmitted to UEs in the subset, and identities of selected beams among a plurality of predetermined beams to be associated with the UEs in the subset from the DU, where each of the plurality of predetermined beams corresponds to a DFT vector, computing a precoding matrix for the RBG based on IDFT vectors corresponding to the selected beams, preparing pre-coded multi-user data by applying the precoding matrix to the multi-user data, and transmitting the pre-coded multi-user data to the UEs in the subset for the RBG using MIMO technologies.

20 Claims, 16 Drawing Sheets

Related U.S. Application Data

(60) Provisional application No. 63/211,978, filed on Jun. 17, 2021.

(51) Int. Cl.
*H04L 1/1812* (2023.01)
*H04B 7/0456* (2017.01)
*H04B 17/391* (2015.01)
*H04B 17/309* (2015.01)
*H04B 7/0417* (2017.01)
*H04B 7/06* (2006.01)
*H04W 88/08* (2009.01)

(52) U.S. Cl.
CPC ......... *H04B 7/0632* (2013.01); *H04B 7/0639* (2013.01); *H04B 7/0695* (2013.01); *H04B 17/309* (2015.01); *H04B 17/3913* (2015.01); *H04L 1/1812* (2013.01); *H04L 27/2628* (2013.01); *H04W 88/085* (2013.01)

(58) Field of Classification Search
CPC  H04B 7/0695; H04B 17/309; H04B 17/3913; H04L 1/1812; H04L 27/2628; H04L 25/0226; H04L 27/261; H04W 88/085
See application file for complete search history.

(56) References Cited

OTHER PUBLICATIONS

International Search Report and Written Opinion for International Application No. PCT/US2022/033960, dated Sep. 22, 2022, 9 pages.

| Algorithm | Required CMACs | Maximum Fronthaul Data Rate |
|---|---|---|
| RZF-based User Grouping | 2,168K | 5120Mbps |
| 2D-IDF-based User Grouping | 113K | 22Mbps |
| 2D-IDF+RZF-based | 187K | 5120Mbps |
| RZF IDFT Vectors | 187K | 22Mbps |

*FIG. 13*

USER GROUPING FOR MULTI-USER MIMO

PRIORITY

This application is a continuation under 35 U.S.C. § 120 of U.S. patent application Ser. No. 17/491,307, filed 30 Sep. 2021, which claims the benefit under 35 U.S.C. § 119(e) of U.S. Provisional Patent Application No. 63/211,978, filed 17 Jun. 2021, which is incorporated herein by reference.

TECHNICAL FIELD

This disclosure generally relates to wireless networks, and in particular, related to Multiple-Input Multiple-Output (MIMO) technologies.

BACKGROUND

Multi-user MIMO (MU-MIMO) is a set of MIMO technologies for multipath wireless communication, in which multiple users or terminals, each radioing over one or more antennas, communicate with one another. In contrast, single-user MIMO (SU MIMO) involves a single multi-antenna-equipped user or terminal communicating with precisely one other similarly equipped node. MU-MIMO algorithms enhance MIMO systems where connections among users count greater than one. MU-MIMO may be generalized into two categories: MIMO broadcast channels (MIMO BC) and MIMO multiple-access channels (MIMO MAC) for downlink and uplink situations, respectively. Downlink MU-MIMO is a case where a base station transmits to multiple receivers within the wireless network. Examples of advanced-transmit processing for downlink MU-MIMO are interference-aware precoding and space-division multiple access (SDMA)-based downlink user scheduling. For advanced-transmit processing, channel state information has to be known at the transmitter. Knowledge of channel state information allows throughput improvement. Thus, methods to obtain channel state information at the transmitter become of significant importance. Downlink MU-MIMO systems have an outstanding advantage over SU-MIMO systems, especially when the number of antennas at the transmitter is larger than the number of antennas at each receiver (user). For MU-MIMO, a base station is the transmitter, and a user is the receiver for downlink connections, and vice versa for uplink connections.

SUMMARY OF PARTICULAR EMBODIMENTS

Particular embodiments described herein relate to systems and methods for optimized user grouping and beamforming for downlink MU-MIMO. In MU-MIMO-capable wireless systems, one of the primary goals may be to maximize the MU-MIMO capacity by placing as many parallel layers of user data as possible in the same Resource Block Group (RBG) in the same Transmit Time Interval (TTI). Reaching a high number of parallel layers may require selecting a set of appropriate users based on their instant channel conditions and performing precoding/beamforming in such a way to orthogonalize transmissions to those users as much as possible. To achieve this goal, the system may perform channel estimation, find the UE channels with the least correlation, group the users accordingly, and calculate the precoder/beamformer. Though most of those tasks may be initially considered L1 tasks, those tasks actually require significant involvement of L2 due to the scheduling aspects of the task. Given the fact that L1, by default, is a stateless entity not keeping any UE state information in its memory, L2 may need to keep UE specific information in its memory including an amount of pending data, served throughput, Quality of Service (QoS) data, and hybrid automatic repeat request (HARQ) information. Therefore, L1/L2 cross layer optimizations may be desired for highly efficient user grouping/beamforming algorithms. When an L1/L2-cross-layer-optimized user grouping and beamforming algorithm is designed, special attention may need to be paid to two aspects. The one may be a computational complexity. Although the computing power of a DU may be significantly higher than the legacy RAN node, the extended amount of computations may be still expensive. Another aspect may be an amount of data to be transferred between the Distributed Unit (DU) and the Radio Unit (RU). The fronthaul between DU and RU has a finite capacity. Thus, the amount of data the L1 conveys to the RU for precoding/beamforming purposes over the fronthaul may be important factor to consider.

In particular embodiments, a DU associated with a gNB may comprise one or more computing devices. An RU associated with the gNB may receive sounding reference signal (SRS) from a plurality of UEs associated with the gNB. The DU may receive the SRS from the RU. The DU may compute an SRS-based channel matrix for each of the plurality of UEs by performing SRS-based downlink channel estimations with the received SRS. The DU may estimate strengths or SNRs for a plurality of pre-determined beams for each of the plurality of UEs by performing a two-dimensional discrete Fourier transform (2D-DFT) on the SRS-based channel matrix for each of the plurality of UEs. The DU may select a subset of the plurality of UEs to which downlink data is to be transmitted for a resource block group (RBG) in a transmission time interval (TTI). The subset may be selected based on the estimated strengths or SNRs of the plurality of pre-determined beams, the CQIs, and downlink traffic information associated with each of the plurality of UEs. The DU may establish a massive MIMO (maMIMO) channel matrix between UEs in the selected subset and transmission antenna ports associated with the gNB based on the SRS-based channel matrices. The DU may compute a precoding matrix for the RBG by performing a regularized zero forcing (RZF) on the maMIMO channel matrix. The DU may determine modulation and coding scheme (MCS) for each of the plurality of UEs for the TTI. The DU may prepare multi-layered UE data for the RBG based on the selected subset of the plurality of UEs, the computed precoding matrix, determined MCS values corresponding to the plurality of UEs, and a number of layers for each of the plurality of UEs. The DU may send the multi-layered UE data and the precoding matrix for the RBG to the RU. The RU may transmit pre-coded multi-layered UE data to UEs in the selected subset for the RBG using MIMO technologies.

In alternative embodiments, an RU associated with a gNB may receive SRS from a plurality of UEs associated with the gNB. The RU may send the SRS to a DU associated with the gNB. The DU may compute an SRS-based channel matrix for each of the plurality of UEs by performing SRS-based downlink channel estimations with the received SRS. The DU may estimate strengths or SNRs for a plurality of pre-determined beams for each of the plurality of UEs by performing a 2D-DFT on the SRS-based channel matrix for each of the plurality of UEs. The DU may select a subset of the plurality of UEs to which downlink data is to be transmitted for an RBG in a TTI. The subset may be selected based on the estimated strengths or SNRs of the plurality of pre-determined beams, the CQIs, and downlink traffic information associated with each of the plurality of UEs. The DU may determine modulation and coding scheme (MCS) for each of the plurality of UEs for the TTI. The DU may associate a beam to each UE in the selected subset for the RBG. The associated beam for a UE is a beam with a highest strength for the UE. The RU may receive information regarding the selected subset, the beams associated with UEs in the selected subset, and data to be transmitted to the UEs in the selected subset from the DU. The RU may establish a maMIMO channel matrix by calculating the IDFT of the DFT vectors corresponding to the beams associated with the UEs in the selected subset. The RU may compute a precoding matrix for the RBG by RZF-ing the maMIMO matrix. The RU may prepare pre-coded multi-user data by applying the precoding matrix to the UE data. The RU may transmit the pre-coded data to the UEs in the selected subset for the RBG using MU-MIMO technologies.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 13 illustrates example comparisons between the presented L1/L2 cross layer optimization algorithms.

DESCRIPTION OF EXAMPLE EMBODIMENTS

Figure 1:
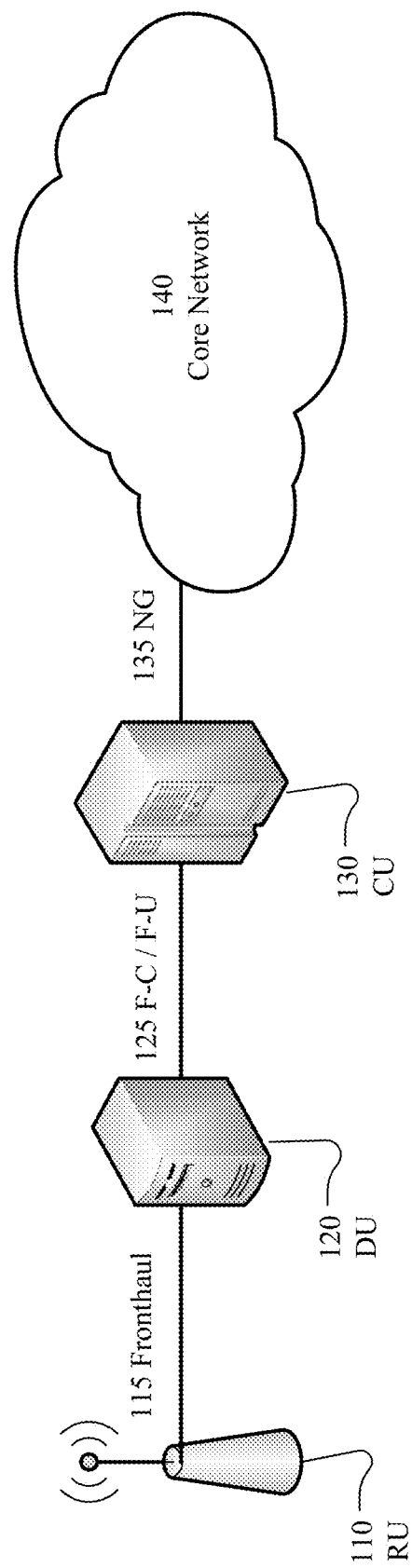
FIG. 1 illustrates an example architecture for open Radio Access Network (RAN).

FIG. 1 illustrates an example architecture for open RAN. A functional split RAN architecture has been proposed for 5G networks, where each of one or more radio units (RUs) 110 is connected with a distributed unit (DU) 120 via a fronthaul 115. An RU 110 may handle the digital front end (DFE) and parts of the physical (PHY) layer as well as the digital beamforming functionality. A DU 120 may locate close to the RU 110 and may comprise a layer-2 (L2) module that runs radio link control (RLC) and media access control (MAC) layers and a layer-1 (L1) module that runs parts of the PHY layer. The DU 120 may include a subset of eNB/gNB functions depending on the functional split option. The DU 120 may be controlled by a CU 130. The CU 130 may be a centralized unit that runs radio resource control (RRC) and packet data convergence protocol (PDCP) layers. A typical gNB may consist of a CU 130 and a DU 120, which are connected via F-C and F-U interfaces 125 for control plane and user plane respectively, and one or more RUs 110. A CU 130 with multiple DUs 120 may support multiple gNBs. The CU 130 may be connected to the core network 140 via NG interface 135. Functional split between RU 110 and DU 120 may bring a number of benefits: (1) cost reduction—less intelligent RU may cost less, (2) ability to look at a sector of RUs 110 at once—the ability may help to enable features like Coordinated Multi-point (CoMP), and (3) resource pooling gains—computationally expensive processing may be pooled in a DU 120. The fronthaul 115 between the RU 110 and the DU 120 may be a bottleneck. In a typical open RAN, fronthaul latency may be constrained to 100 microsections. Although this disclosure describes a particular RAN architecture, this disclosure contemplates any suitable RAN architecture.

RZF-Based User Grouping

RZF-based user grouping may require full channel state information in L2 of the DU 120. The DU 120 may perform an almost exhaustive search to find a combination of users that may maximize the capacity. In the process of the search, the DU 120 may calculate the precoding matrix a number of times. Although the RZF-based user grouping may result in minimum inter-layer interference, and hence, maximized signal-to-interference-and-noise-ratio (SINR), the RZF-based user grouping is a most computationally expensive algorithm.

In particular embodiments, a DU 120 associated with a gNB, a type of base station, may comprise one or more computing devices. An RU 110 associated with the gNB may receive SRS from a plurality of user equipments (UEs) associated with the gNB. The DU 120 may receive the SRS from the RU 110. The DU 120 may compute SRS-based channel estimates for each of the plurality of UEs by performing SRS-based downlink channel estimations with the received SRS. The DU 120 may select a subset of the plurality of UEs to which downlink data is to be transmitted for an RBG in a TTI. The subset may be selected based on the SRS-based channel estimates, the CQIs, and downlink traffic information associated with each of the plurality of UEs. A process for selecting the subset may also comprise computing an RZF precoding matrix to be used for the RBG. The DU 120 may determine modulation and coding scheme (MCS) for each of the plurality of UEs for the TTI. The DU 120 may prepare multi-layered UE data for the RBG based on the selected subset of the plurality of UEs, the computed precoding matrix, determined MCS values corresponding to the plurality of UEs, and a number of layers for each of the plurality of UEs. The DU 120 may send the multi-layered UE data and the precoding matrix for the RBG to the RU 110. The RU 110 may transmit pre-coded multi-layered UE data to UEs in the selected subset for the RBG using MIMO technologies. Although this disclosure describes performing an RZF-based user grouping for downlink MU-MIMO in a particular manner, this disclosure contemplates performing an RZF-based user grouping for downlink MU-MIMO in any suitable manner.

Figure 2:
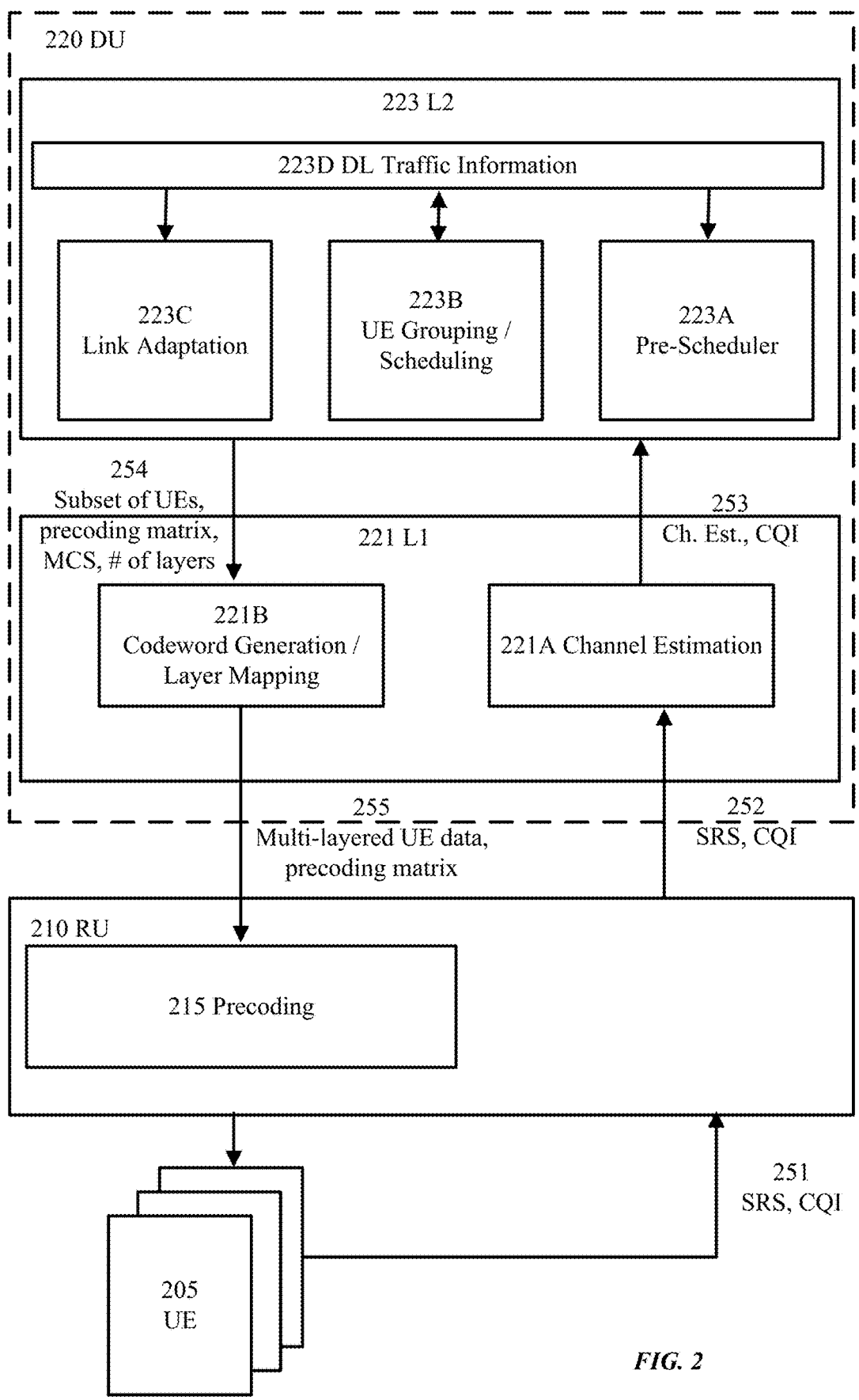
FIG. 2 illustrates an example logical structure for a Regularized Zero Forcing (RZF)-based user grouping for downlink MU-MIMO.

FIG. 2 illustrates an example logical structure for an RZF-based user grouping for downlink MU-MIMO. In particular embodiments, an RU 210 associated with a gNB may receive SRS from a plurality of UEs 205 associated with the gNB at step 251. At step 252, the L1 221 of the DU 220 may receive SRS from the RU 210. The RU 210 may also receive channel quality indicators (CQIs) from the plurality of UEs 205 at step 251. At step 252, the L1 221 may also receive the CQIs from the RU 210.

In particular embodiments, a channel estimation unit 221A of the L1 221 may compute SRS-based channel estimates for each of the plurality of UEs 205 by performing SRS-based downlink channel estimations with the received SRS. An SRS-based channel estimate may be represented by a channel matrix. An SRS-based downlink channel estimation may be an SRS-based least squares channel estimation. At step 253, the L1 may convey the computed SRS-based channel estimates and CQIs for the plurality of UEs 205 to an L2 223 of the DU 220 over an L1/L2 interface. Although this disclosure describes calculating channel estimates based on SRS in a particular manner, this disclosure contemplates calculating channel estimates based on SRS in any suitable manner.

In particular embodiments, The L2 223 may select a subset of the plurality of UEs 205 to which downlink data is to be transmitted for a RBG in a TTI. The subset may be selected based on the SRS-based channel estimates, the CQIs, and downlink traffic information associated with each of the plurality of UEs 205. The downlink traffic information associated with a UE 205 may comprise traffic class type, HARQ retransmission information, and any pre-scheduled persistent or semi-persistent transmission allocations. A downlink traffic information unit 223D may comprise down-link UE traffic queues and an HARQ module. A process for selecting the subset may also comprise computing a precoding matrix to be used for the RBG. Although this disclosure describes selecting a subset of UEs to which downlink data is to be transmitted for a RBG in a TTI in a particular manner, this disclosure contemplates selecting a subset of UEs to which downlink data is to be transmitted for a RBG in a TTI in any suitable manner.

In particular embodiments, a pre-scheduler unit 223A in the L2 223 of the DU 220 may calculate an achievable weighted data rate for each of the plurality of UEs 205. To calculate an achievable weighted data rate for each of the plurality of UEs, the pre-scheduler unit 223A may calculate a signal-to-noise ratio (SNR) for each of the plurality of UEs 205 based on the SRS-based channel estimate and the CQI for the UE 205. The pre-scheduler unit 223A may take traffic class types, HARQ retransmission information, and any pre-scheduled persistent/semi-persistent allocations as per-TTI input from the downlink traffic information unit 223D. The pre-scheduler unit 223A may also take information regarding scheduled UEs and total pending bytes in the UE traffic queues as per-RBG input from the downlink traffic information unit 223D. The pre-scheduler unit 223A may determine a scheduling priority per UE 205 by calculating user selection metrics based on the downlink traffic information including traffic class types, HARQ retransmission information, any pre-scheduled persistent/semi-persistent allocations, scheduled UEs, and total pending bytes in the UE traffic queues. The user selection metrics may comprise proportional fairness metric, max CQI, round robin, or any suitable user selection metric. The pre-scheduler unit 223A may determine a weight for each of the plurality of UEs 205 based on a scheduling priority associated with the UE 205. Then, the pre-scheduler unit 223A may calculate the achievable weighted data rate for the UE based on the calculated SNR and the determined weight. Although this disclosure describes calculating an achievable weighted data rate for a UE in a particular manner, this disclosure contemplates calculating an achievable weighted data rate for a UE in any suitable manner.

In particular embodiments, a UE grouping/scheduling unit 223B in the L2 223 of the DU 220 may determine a subset of the plurality of UEs that maximizes a sum of weighted data rate for the RBG. To determine the subset of the plurality of UEs, the UE grouping/scheduling unit 223B may sort the plurality of UEs 205 based on their corresponding achievable weighted data rate. the UE grouping/scheduling unit 223B may prepare an empty candidate set. The UE grouping/scheduling unit 223B may move the first UE among the sorted UEs into the candidate set. Then the UE grouping/scheduling unit 223B may repeat removing a candidate UE from the sorted UEs and adding the candidate UE into the candidate set when adding the candidate UE to the candidate set is determined to increase a sum of achievable weighted data rate for the candidate set. The UE grouping/scheduling unit 223B may stop the repetition when a finishing condition is met. The finishing condition may comprise (1) a size of the candidate set reaches a pre-determined size, or (2) a number of the repetition reaches a pre-determined number. Although this disclosure describes determining a subset of the plurality of UEs that maximizes a sum of weighted data rate for the RBG in a particular manner, this disclosure contemplates determining a subset of the plurality of UEs that maximizes a sum of weighted data rate for the RBG in any suitable manner.

In particular embodiments, the UE grouping/scheduling unit 223B may determine the candidate UE among the sorted UEs. The UE grouping/scheduling unit 223B may select first k UEs among the sorted UEs. The UE grouping/scheduling unit 223B may calculate a sum of correlation values with UEs in the candidate set for each of the selected k UEs. Then, the UE grouping/scheduling unit 223B may determine a UE associated with a minimum sum of correlation values as the candidate UE. Although this disclosure describes determining a candidate UE among the sorted UEs in a particular manner, this disclosure contemplates determining a candidate UE among the sorted UEs in any suitable manner.

In particular embodiments, the UE grouping/scheduling unit 223B may, in the repetition loop, determine whether adding the candidate UE to the candidate set increases a sum of achievable weighted data rate for the candidate set. The UE grouping/scheduling unit 223B may calculate a sum of achievable weighted data rate if the candidate UE is added to the candidate set. First, the UE grouping/scheduling unit 223B may define a temporary set with the candidate UE and all the UEs in the candidate set. The UE grouping/scheduling unit 223B may determine whether adding the candidate UE to the candidate set increases a sum of achievable weighted data rate for the candidate set by comparing the sum of achievable weighted data rate for the temporary set and a previously-calculated sum of achievable weighted data rate for the candidate set. To calculate the sum of achievable weighted data rate for the temporary set, the UE grouping/scheduling unit 223B may calculate a regularized pseudo-inverse of a massive MIMO (maMIMO) channel matrix between UEs in the temporary set and transmission antenna ports associated with the base station. The UE grouping/scheduling unit 223B may obtain a regularized zero forcing (RZF) precoding matrix by normalizing the calculated regularized pseudo-inverse of the maMIMO channel matrix. And, the UE grouping/scheduling unit 223B may calculate a sum of achievable weighted data rate for the temporary set based on the RZF precoding matrix. Although this disclosure describes determining whether adding the candidate UE to the candidate set increases a sum of achievable weighted data rate for the candidate set in a particular manner, this disclosure contemplates determining whether adding the candidate UE to the candidate set increases a sum of achievable weighted data rate for the candidate set in any suitable manner.

In particular embodiments, a link adaptation unit 223C of the L1 223 in the DU 220 may determine modulation and coding scheme (MCS) for each of the plurality of UEs 205 for the TTI. The link adaptation unit 223C may calculate an initial (rough) MCS as a function of an effective SINR (subject to an upper limit set by CQI) for a UE. The link adaptation unit 223C may determine a Transport Block (TB) size as a function of the initial MCS and a number of resource blocks allocated to the UE. The link adaptation unit 223C may adjust the effective SINR based on HARQ responses acquired from the downlink traffic information unit 223D. The link adaptation unit 223C may optimize the MCS in a recursive fashion while sticking to a block error rate (BLER) target. Although this disclosure describes determining MCS for each of the plurality of UEs for the TTI in a particular manner, this disclosure contemplates determining MCS for each of the plurality of UEs for the TTI in any suitable manner.

In particular embodiments, at step 254, the L2 223 may convey the selected subset of UEs, corresponding precoding matrix per RBG to the L1 221. The L2 223 may also convey the determined MCS and a number of layers for each of the UEs per TTI to the L1 221.

In particular embodiments, a codeword generation/layer mapping unit 221B of the L2 221 in the DU 220 may prepare multi-layered UE data for the RBG based on the selected subset of the plurality of UEs, the computed precoding matrix, the determined MCS values corresponding to the plurality of UEs, and a number of layers for each of the plurality of UEs. For preparing multi-layered UE data for the RBG, the codeword generation/layer mapping unit 221B may generate codewords using information associated with the selected subset of the plurality of UEs, the determined MCS value for each of the plurality of UEs, and the number of layers for each of the plurality of UEs. The codeword generation/layer mapping unit 221B may map user data onto layers allocated to the UE for each of the plurality of UEs based on the computed precoding matrix. Although this disclosure describes preparing multi-layered UE data for the RBG in a particular manner, this disclosure contemplates preparing multi-layered UE data for the RBG in any suitable manner.

In particular embodiments, at step 255, the L1 221 of the DU 220 may send the multi-layered UE data and the precoding matrix for the RBG to the RU 210 over the fronthaul 115.

In particular embodiments, a precoding unit 215 of the RU 210 may perform a precoding on the multi-layered UE data using the precoding matrix. The RU 210 may transmit pre-coded multi-layered UE data to UEs 205 in the selected subset for the RBG using MU-MIMO technologies. Although this disclosure describes transmitting UE data to the UEs in a selected subset of plurality of UEs using MU-MIMO technologies in a particular manner, this disclosure contemplates transmitting UE data to the UEs in a selected subset of plurality of UEs using MU-MIMO technologies in any suitable manner.

Figure 3:
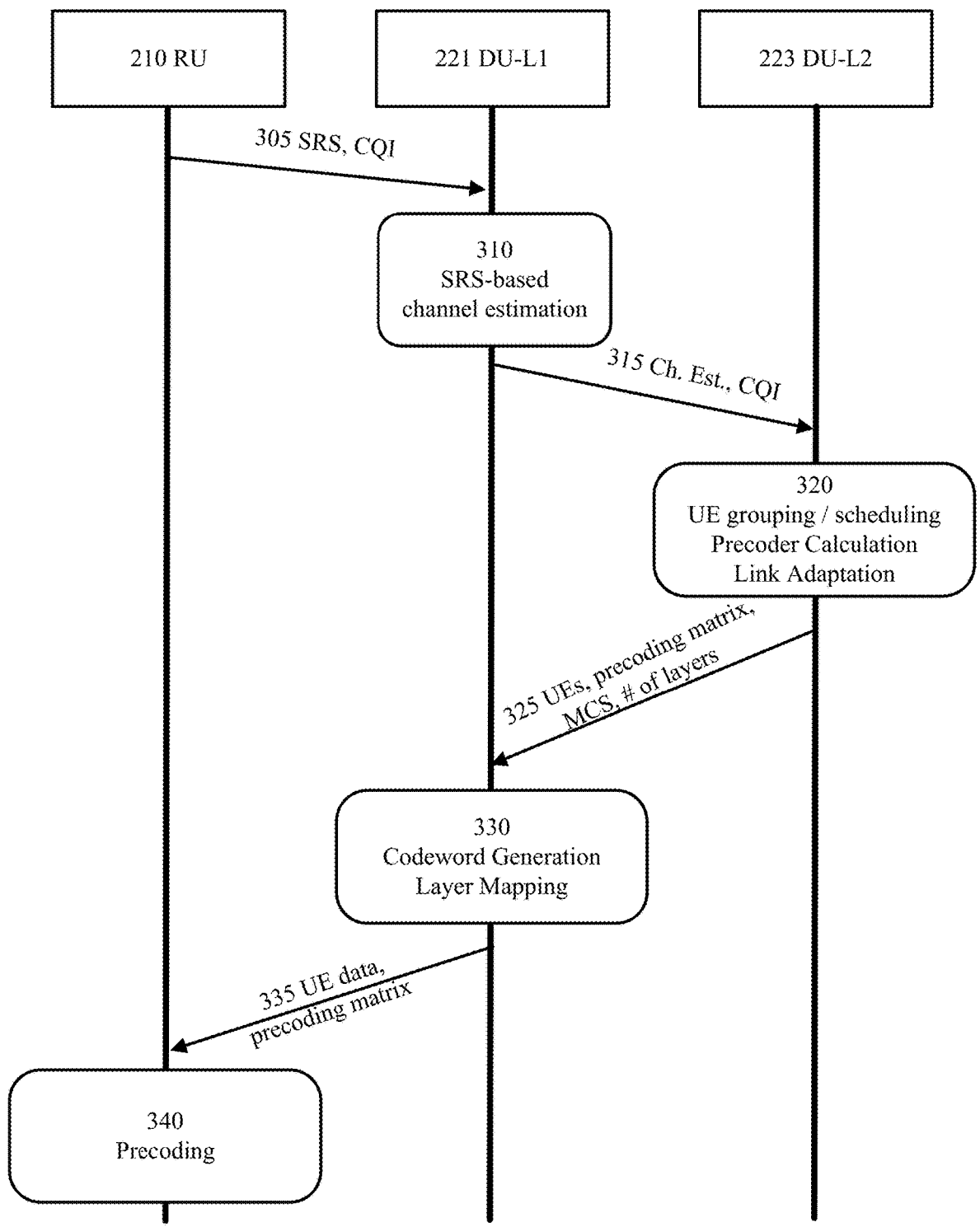
FIG. 3 illustrates an example flow for RZF-based user grouping for downlink MU-MIMO.

FIG. 3 illustrates an example flow for RZF-based user grouping for downlink MU-MIMO. At step 305, the RU 210 may send SRS and CQI received from the plurality of UEs 205 to the L1 221 of the DU 220. At step 310, the L1 221 may perform SRS-based channel estimation. At step 315, the L1 221 may convey the channel estimates for the plurality of UEs 205 and CQIs to the L2 223 of the DU 220. At step 320, the L2 223 may perform the user grouping/scheduling based on the received channel estimates, CQIs and downlink traffic information. A precoding matrix may be generated in the process of the user grouping/scheduling. The L2 223 may also perform a link adaptation procedure. At step 325, the L2 223 may convey information regarding the scheduled UE, the precoding matrix, determined MCSs, and a number of layers assigned to each UE to the L1 221. At step 330, the L1 221 may perform the codeword generation and layer mapping. At step 335, the L1 221 may send the multi-layered UE data and the precoding matrix to the RU 210. At step 340, the RU 210 may perform precoding on the multi-layered UE data using the precoding matrix. The RU 210 may send the pre-coded UE data to the scheduled UEs. Although this disclosure describes a particular flow for downlink MU-MIMO downlink based on the RZF-based user group algorithm, this disclosure contemplates any suitable flow for downlink MU-MIMO downlink based on the RZF-based user group algorithm.

2D-DFT-Based User Grouping

2D-DFT-based user grouping algorithm may select a subset of UEs whose beams are geometrically distinguishable from each other. The 2D-DFT-based user grouping algorithm may require only the knowledge of beams with highest strength for each of the plurality of UEs. The algorithm may require relatively lower computing power because the 2D-DFT-based user grouping is much simpler than RZF-based user grouping algorithm. The 2D-DFT-based user grouping may be vulnerable to inter-layer interference. When a beams with the highest strength is associated with a UE, the UE may be vulnerable to directions of secondary beams for the UE. When transmissions to other UEs in those directions are made, the UE may experience an interference. Information regarding secondary beams for the UE may also be used for user grouping to mitigate the inter-layer interference.

In particular embodiments, a DU 120 associated with a gNB may comprise one or more computing devices. An RU 110 associated with the gNB may receive sounding reference signal (SRS) from a plurality of user equipments (UEs) associated with the gNB. The DU 120 may receive the SRS from the RU 110. The DU 120 may compute an SRS-based channel matrix for each of the plurality of UEs by performing SRS-based downlink channel estimations with the received SRS. The DU 120 may estimate strengths or SNRs for a plurality of pre-determined beams for each of the plurality of UEs by performing a 2D-DFT on the SRS-based channel matrix for each of the plurality of UEs. The DU 120 may select a subset of the plurality of UEs to which downlink data is to be transmitted for an RBG in a TTI. The subset may be selected based on the estimated strengths or SNRs of the plurality of pre-determined beams, the CQIs, and downlink traffic information associated with each of the plurality of UEs. The DU 120 may determine modulation and coding scheme (MCS) for each of the plurality of UEs for the TTI. The DU 120 may associate a beam to each UE in the selected subset for the RBG. The associated beam for a UE is a beam with a highest strength for the UE. The DU 120 may send information regarding the beams associated with UEs in the selected subset and data to be transmitted to the UEs in the selected subset to the RU 110. The RU 110 may transmit beamformed data to the UEs in the selected subset for the RBG using their associated beams. Although this disclosure describes performing a 2D-DFT-based user grouping for downlink MU-MIMO in a particular manner, this disclosure contemplates performing a 2D-DFT-based user grouping for downlink MU-MIMO in any suitable manner.

Figure 4:
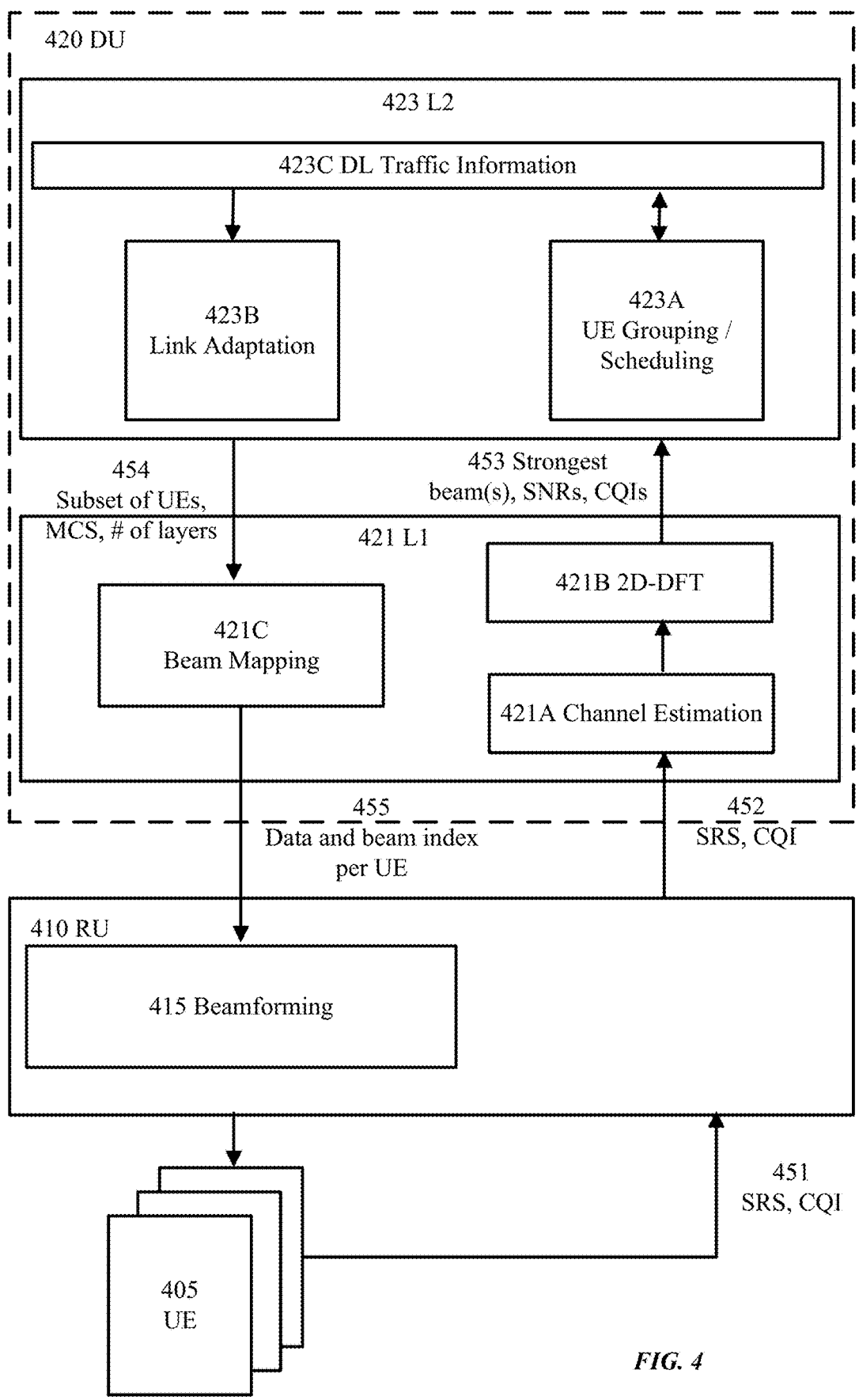
FIG. 4 illustrates an example logical structure for a 2D-DFT-based user grouping for downlink MU-MIMO.

FIG. 4 illustrates an example logical structure for a 2D-DFT-based user grouping for downlink MU-MIMO. In particular embodiments, an RU 410 associated with a gNB may receive SRS from a plurality of UEs 405 associated with the gNB at step 451. At step 452, L1 421 of the DU 420 may receive SRS from the RU 410. The RU 410 may also receive CQIs from the plurality of UEs 405 at step 451. At step 452, the L1 421 may also receive the CQIs from the RU 410.

In particular embodiments, the channel estimation unit 421A of the L1 421 of the DU 420 may compute a channel matrix for each of the plurality of UEs 405 by performing SRS-based downlink channel estimations with the received SRS. The channel matrix may be between an antenna array for the UE 405 and an antenna array for the gNB. An SRS-based downlink channel estimation may be an SRS-based least squares channel estimation. Although this disclosure describes computing a channel matrix for a UE in a particular manner, this disclosure contemplates computing a channel matrix for a UE in any suitable manner.

In particular embodiments, a 2D-DFT unit 421B of the L1 421 in the DU 420 may estimate strengths or SNRs for a plurality of pre-determined beams for each of the plurality of UEs based on the computed channel matrices. The 2D-DFT unit 421B may perform a 2D-DFT on the channel matrix for the UE to estimate strengths or SNRs for the plurality of pre-determined beams. As the channel matrix may be between an antenna array for the UE 405 and an antenna array for the gNB, the antenna array size may play a direct role in a beam resolution. The 2D-DFT unit 421B may perform oversampling of DFT vectors for better granularity. At step 453, the L1 421 may convey indices of one or more beams with highest strength and their corresponding SNRs, and CQI for each of the plurality of UEs 405 to the L2 423 over an L1/L2 interface. Although this disclosure describes estimating strengths or SNRs for a plurality of pre-determined beams for a UE in a particular manner, this disclosure contemplates estimating strengths or SNRs for a plurality of pre-determined beams for a UE in any suitable manner.

In particular embodiments, the L2 423 may select a subset of the plurality of UEs to which downlink data is to be transmitted for a RBG in a TTI based on the one or more beams with highest strength and their corresponding SNRs, the CQIs, and downlink traffic information associated with each of the plurality of UEs. The downlink traffic information associated with a UE 405 may comprise traffic class type, HARQ retransmission information, and any pre-scheduled persistent or semi-persistent transmission allocations. A downlink traffic information unit 423C may comprise downlink UE traffic queues and an HARQ module. Although this disclosure describes selecting a subset of the plurality of UEs to which downlink data is to be transmitted for a RBG in a TTI in a particular manner, this disclosure contemplates selecting a subset of the plurality of UEs to which downlink data is to be transmitted for a RBG in a TTI in any suitable manner.

In particular embodiments, a UE grouping/scheduling unit 423A of the L2 423 in the DU 420 may calculate a user selection metric for each of the plurality of UEs. In particular embodiments, the user selection metric may comprise a proportional fair metric. Calculating a PF metric for a UE may be based on a beam with the highest strength for the UE and its corresponding SNR, and the downlink traffic information associated with the UE. Although this disclosure describes calculating a user selection metric for a UE in a particular manner, this disclosure contemplates calculating a user selection metric for a UE in any suitable manner.

In particular embodiments, the UE grouping/scheduling unit 423A may determine a subset of the plurality of UEs that maximizes an estimated system capacity for the RBG. The UE grouping/scheduling unit 423A may sort the plurality of UEs 405 based on their corresponding PF metrics. The UE grouping/scheduling unit 423A may prepare an empty candidate set. The UE grouping/scheduling unit 423A may prepare an empty list of reserved beams. The UE grouping/scheduling unit 423A may add the first UE among the sorted UEs into the candidate set. The UE grouping/scheduling unit 423A may repeat removing a first UE from the sorted UEs as a candidate UE and adding the candidate UE into the candidate set when (1) a beam with the highest strength for the candidate UE is not in the list of reserved beams and (2) adding the candidate UE to the candidate set is determined not to decrease the estimated system capacity for UEs in the candidate set. The UE grouping/scheduling unit 423A may stop the repetition when a finishing condition is met. The finishing condition may comprise a size of the candidate set reaches a pre-determined size, or no more UE exists in the sorted UEs. Adding a UE into the candidate set may comprise adding a beam with the highest strength for the UE to the list of reserved beams. Although this disclosure describes determining a subset of the plurality of UEs that maximizes an estimated system capacity for the RBG in a particular manner, this disclosure contemplates determining a subset of the plurality of UEs that maximizes an estimated system capacity for the RBG in any suitable manner.

In particular embodiments, the L1 421 may perform oversampling of DFT vectors for better granularity. Although, using an oversampled set of basis vectors may improve system performance due to higher granularity, an oversampled version of DFT vectors does not constitute an orthogonal Eigenbasis. Thus, an energy in one beam may be seen leaking to a number of other beams. In order to avoid interferences caused by an oversampling, the UE grouping/scheduling unit 423A may also add k adjacent beams to the beam with the highest strength for the UE to the list of reserved beams, where k may be an oversampling factor. The UE grouping/scheduling unit 423A may add k/2 adjacent beams in each side of the beam with the highest strength to the list of reserved beams. Although this disclosure describes avoiding interferences caused by an oversampling in a particular manner, this disclosure contemplates avoiding interferences caused by an oversampling in any suitable manner.

In particular embodiments, most UEs may have secondary beams along with the beam with the highest strength due to multipath. If a transmission is made to a direction that collides with the secondary beams of the UE, the UE may experience an interference. To mitigate this type of interferences, the UE grouping/scheduling unit 423A may add n beams with next highest strength for the UE beyond the beam with the highest strength for the UE to the list of reserved beams. The L1 221 may need to convey information regarding the n beams for the UE to the L2 223 at step 453 for this feature. Although this disclosure describes avoiding interferences caused by secondary beams in a particular manner, this disclosure contemplates avoiding interferences caused by secondary beams in any suitable manner.

In particular embodiments, the UE grouping/scheduling unit 423A may repeatedly determine in a loop whether adding the candidate UE to the candidate set decreases an estimated system capacity for UEs in the candidate set. The UE grouping/scheduling unit 423A may define a temporary set as UEs in the candidate set and the candidate UE. The UE grouping/scheduling unit 423A may adjust a transmission signal power based on a number of UEs in the temporary set. The UE grouping/scheduling unit 423A may calculate an estimated system capacity for UEs in the temporary set based on an assumption that a beam with the highest strength for each UE is used for a transmission. The UE grouping/scheduling unit 423A may determine whether adding the candidate UE to the candidate set decreases an estimated system capacity for the candidate set by comparing the estimated system capacity for UEs in the temporary set and a previously-calculated estimated system capacity for UEs in the candidate set. Although this disclosure describes determining whether adding the candidate UE to the candidate set decreases an estimated system capacity for UEs in the candidate set in a particular manner, this disclosure contemplates determining whether adding the candidate UE to the candidate set decreases an estimated system capacity for UEs in the candidate set in any suitable manner.

In particular embodiments, a link adaptation unit 423B of the L1 423 in the DU 420 may determine MCS for each of the plurality of UEs 405 for the TTI. The link adaptation unit 423B may calculate an initial MCS as a function of an effective SINR (subject to an upper limit set by CQI) for a UE. The link adaptation unit 423B may determine a Transport Block (TB) size as a function of the initial MCS and a number of resource blocks allocated to the UE. The link adaptation unit 423B may adjust the effective SINR based on HARQ responses acquired from the downlink traffic information unit 423C. The link adaptation unit 423B may optimize the MCS in a recursive fashion while sticking to a BLER target. Although this disclosure describes determining MCS for each of the plurality of UEs for the TTI in a particular manner, this disclosure contemplates determining MCS for each of the plurality of UEs for the TTI in any suitable manner.

In particular embodiments, at step 454, the L2 423 may convey the selected subset of UEs per RBG to the L1 421. The L2 423 may also convey the determined MCS and a number of layers for each of the UEs per TTI to the L1 421.

In particular embodiments, a beam mapping unit 421C of the L1 421 in the DU 420 may associate a beam to each UE in the selected subset for the RBG. The associated beam for a UE is a beam with the highest strength for the UE. Although this disclosure describes mapping a beam to a UE in a particular manner, this disclosure contemplates mapping a beam to a UE in any suitable manner.

In particular embodiments, at step 455, the L1 421 may send information regarding the beams associated with UEs in the selected subset and data to be transmitted to the UEs in the selected subset per RBG to RU 410 over the fronthaul 115.

In particular embodiments, a beamforming unit 415 of the RU 410 may perform beamforming on the UE data using a beam associated with the UE. The RU 410 may transmit the beamformed UE data to UEs 405 in the selected subset for the RBG using MU-MIMO technologies. Although this disclosure describes transmitting UE data to the UEs in a selected subset of plurality of UEs using MU-MIMO technologies in a particular manner, this disclosure contemplates transmitting UE data to the UEs in a selected subset of plurality of UEs using MU-MIMO technologies in any suitable manner.

Figure 5:
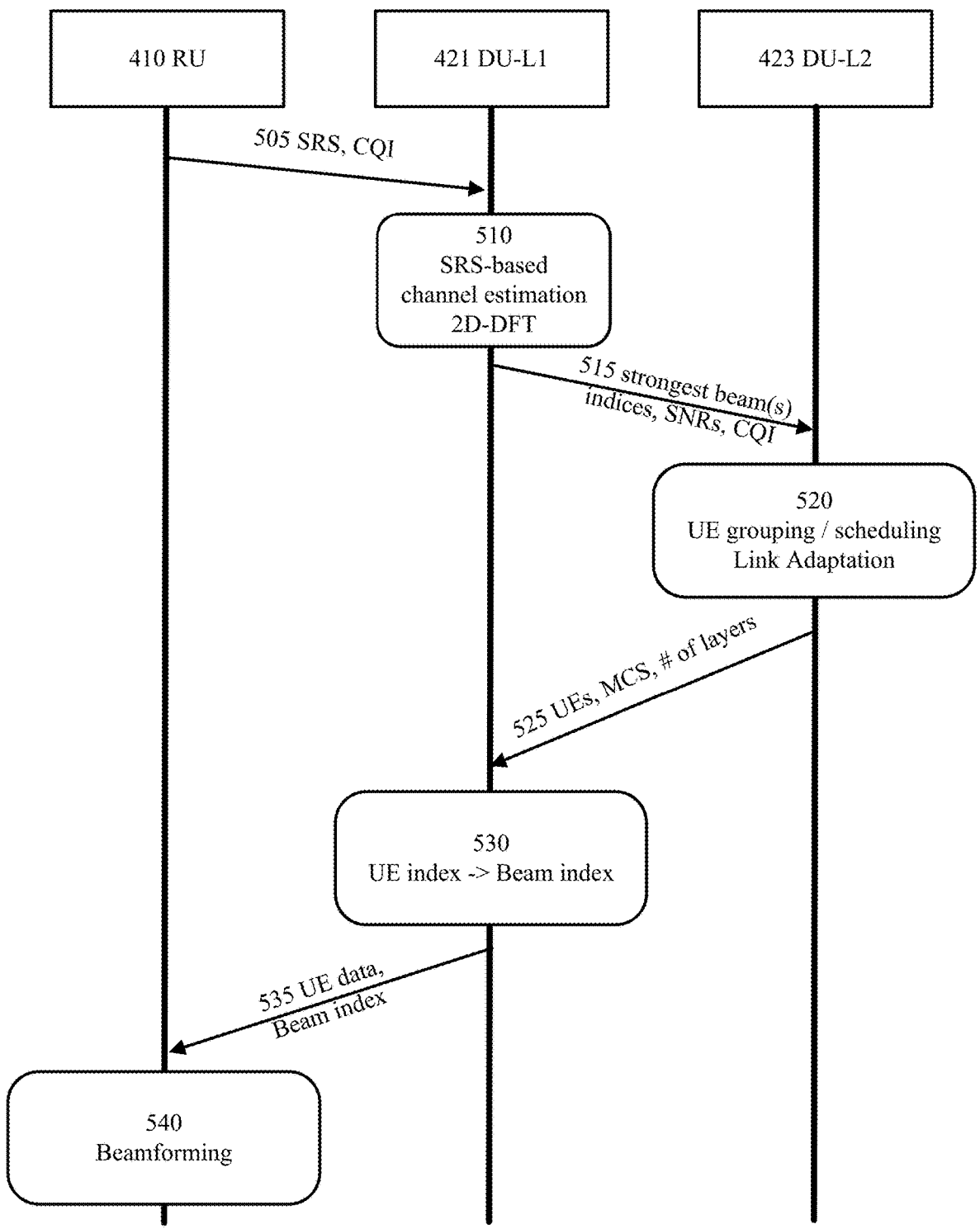
FIG. 5 illustrates an example flow for 2D-DFT-based user grouping for downlink MU-MIMO.

FIG. 5 illustrates an example flow for 2D-DFT-based user grouping for downlink MU-MIMO. At step 505, the RU 410 may send SRS and CQI received from the plurality of UEs 405 to the L1 421 of the DU 420. At step 510, the L1 421 may compute a channel matrix for each of the plurality of UEs 405 based on the SRS and estimate strengths or SNRs of a plurality of pre-determined beams for the UE by performing 2D-DFT on the channel matrix. At step 515, the L1 421 may convey information regarding one or more beams with highest strength for each UE and their corresponding SNRs, and CQIs to the L2 423 of the DU 420. At step 520, the L2 423 may perform the user grouping/scheduling based on the received information regarding the one or more beams with highest strength, their corresponding SNRs, CQIs and downlink traffic information for each UE. The L2 423 may also perform a link adaptation procedure to determine an MCS value for each UE per TTI. At step 525, the L2 423 may convey information regarding the scheduled UEs, determined MCS, and a number of layers assigned to each UE to the L1 421. At step 530, the L1 421 may map a beam to a UE in the scheduled UEs. At step 535, the L1 421 may send the UE data and an index of the beam associated with each UE to the RU 410. At step 540, the RU 410 may perform beamforming on the UE data using the beam associated with the UE. The RU 410 may send the beamformed UE data to the scheduled UEs. Although this disclosure describes a particular flow for downlink MU-MIMO downlink based on the 2D-DFT-based user group algorithm, this disclosure contemplates any suitable flow for downlink MU-MIMO downlink based on the 2D-DFT-based user group algorithm.

2D-DFT+RZF-Based User Grouping

2D-DFT+RZF-based user grouping algorithm may select a subset of UEs for an RBG in a same manner with the 2D-DFT-based user grouping algorithm. As L1 of the DU 120 possesses the full channel information for all the UEs, the L1 may be able to establish a maMIMO channel matrix between the selected UEs and transmission antenna ports associated with the gNB. The L1 may compute a precoding matrix for an RBG by performing an RZF on the maMIMO channel matrix. While user grouping may require relatively simple computations based on the knowledge of beam(s) with highest strength for each UE, the computed precoding matrix may reduce inter-layer interferences. Consequently, the 2D-DFT+RZF-based user grouping algorithm may achieve performance close to the RZF-based user grouping algorithm. The computational load may be mostly on the L1 of the DU.

In particular embodiments, a DU 120 associated with a gNB may comprise one or more computing devices. An RU 110 associated with the gNB may receive SRS from a plurality of UEs associated with the gNB. The DU 120 may receive the SRS from the RU 110. The DU 120 may compute an SRS-based channel matrix for each of the plurality of UEs by performing SRS-based downlink channel estimations with the received SRS. The DU 120 may estimate strengths or SNRs for a plurality of pre-determined beams for each of the plurality of UEs by performing a 2D-DFT on the SRS-based channel matrix for each of the plurality of UEs. The DU 120 may select a subset of the plurality of UEs to which downlink data is to be transmitted for an RBG in a TTI. The subset may be selected based on the estimated strengths or SNRs of the plurality of pre-determined beams, the CQIs, and downlink traffic information associated with each of the plurality of UEs. The DU 120 may establish a maMIMO channel matrix between UEs in the selected subset and transmission antenna ports associated with the gNB based on the SRS-based channel matrices. The DU 120 may compute a precoding matrix for the RBG by RZF-ing the maMIMO channel matrix. The DU 120 may determine modulation and coding scheme (MCS) for each of the plurality of UEs for the TTI. The DU 120 may prepare multi-layered UE data for the RBG based on the selected subset of the plurality of UEs, the computed precoding matrix, determined MCS values corresponding to the plurality of UEs, and a number of layers for each of the plurality of UEs. The DU 120 may send the multi-layered UE data and the precoding matrix for the RBG to the RU 110. The RU 110 may transmit pre-coded multi-layered UE data to UEs in the selected subset for the RBG using MIMO technologies. Although this disclosure describes performing a 2D-DF T+RZF-based user grouping for downlink MU-MIMO in a particular manner, this disclosure contemplates performing a 2D-DFT+RZF-based user grouping for downlink MU-MIMO in any suitable manner.

Figure 6:
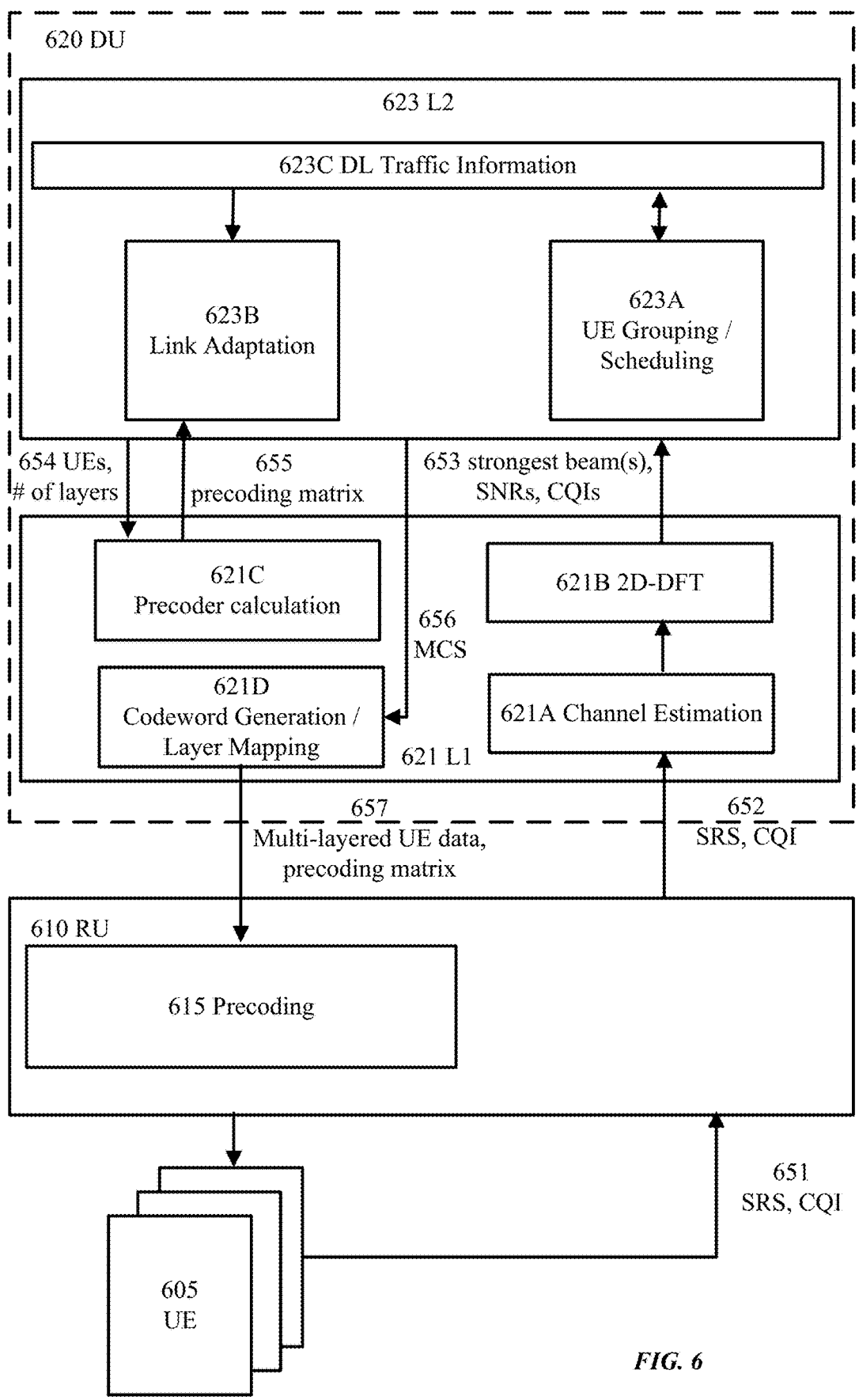
FIG. 6 illustrates an example logical structure for a 2D-DFT+RZF-based user grouping for downlink MU-MIMO.

FIG. 6 illustrates an example logical structure for a 2D-DFT+RZF-based user grouping for downlink MU-MIMO. In particular embodiments, an RU 610 associated with a gNB may receive SRS from a plurality of UEs 605 associated with the gNB at step 651. At step 652, L1 621 of the DU 620 may receive SRS from the RU 610. The RU 610 may also receive CQIs from the plurality of UEs 605 at step 651. At step 652, the L1 621 may also receive the CQIs from the RU 610.

In particular embodiments, the channel estimation unit 621A of the L1 621 of the DU 620 may compute a channel matrix for each of the plurality of UEs 605 by performing SRS-based downlink channel estimations with the received SRS. The channel matrix may be between an antenna array for the UE 605 and an antenna array for the gNB. An SRS-based downlink channel estimation may be an SRS-based least squares channel estimation. Although this disclosure describes computing a channel matrix for a UE in a particular manner, this disclosure contemplates computing a channel matrix for a UE in any suitable manner.

In particular embodiments, a 2D-DFT unit 621B of the L1 621 in the DU 620 may estimate strengths or SNRs for a plurality of pre-determined beams for each of the plurality of UEs 605 based on the computed channel matrices. The 2D-DFT unit 621B may perform a 2D-DFT on the channel matrix for the UE to estimate strengths or SNRs for the plurality of pre-determined beams. Similarly to the 2D-DFT-based user grouping algorithm, the 2D-DFT unit 621B may perform oversampling of DFT vectors for better granularity. At step 653, the L1 621 may convey indices of one or more beams with highest strength and their corresponding SNRs, and CQI for each of the plurality of UEs 605 to the L2 623 over an L1/L2 interface. Although this disclosure describes estimating strengths or SNRs for a plurality of pre-determined beams for a UE in a particular manner, this disclosure contemplates estimating strengths or SNRs for a plurality of pre-determined beams for a UE in any suitable manner.

In particular embodiments, the L2 623 may select a subset of the plurality of UEs to which downlink data is to be transmitted for a RBG in a TTI based on the one or more beams with highest strength and their corresponding SNRs, the CQIs, and downlink traffic information associated with each of the plurality of UEs. The downlink traffic information associated with a UE 605 may comprise traffic class type, HARQ retransmission information, and any pre-scheduled persistent or semi-persistent transmission allocations. A downlink traffic information unit 623C may comprise downlink UE traffic queues and an HARQ module. Although this disclosure describes selecting a subset of the plurality of UEs to which downlink data is to be transmitted for a RBG in a TTI in a particular manner, this disclosure contemplates selecting a subset of the plurality of UEs to which downlink data is to be transmitted for a RBG in a TTI in any suitable manner.

In particular embodiments, a UE grouping/scheduling unit 623A of the L2 623 in the DU 620 may calculate a user selection metric for each of the plurality of UEs. In particular embodiments, the user selection metric may comprise a proportional fair metric. Calculating a PF metric for a UE may be based on a beam with the highest strength for the UE and its corresponding SNR, and the downlink traffic information associated with the UE. Although this disclosure describes calculating a user selection metric for a UE in a particular manner, this disclosure contemplates calculating a user selection metric for a UE in any suitable manner.

In particular embodiments, the UE grouping/scheduling unit 623A may determine a subset of the plurality of UEs that maximizes an estimated system capacity for the RBG. The UE grouping/scheduling unit 623A may sort the plurality of UEs 605 based on their corresponding PF metrics. The UE grouping/scheduling unit 623A may prepare an empty candidate set. The UE grouping/scheduling unit 623A may prepare an empty list of reserved beams. The UE grouping/scheduling unit 623A may add the first UE among the sorted UEs into the candidate set. The UE grouping/scheduling unit 623A may repeat removing a first UE from the sorted UEs as a candidate UE and adding the candidate UE into the candidate set when (1) a beam with the highest strength for the candidate UE is not in the list of reserved beams and (2) adding the candidate UE to the candidate set is determined not to decrease the estimated system capacity for UEs in the candidate set. The UE grouping/scheduling unit 623A may stop the repetition when a finishing condition is met. The finishing condition may comprise a size of the candidate set reaches a pre-determined size, or no more UE exists in the sorted UEs. Adding a UE into the candidate set may comprise adding a beam with the highest strength for the UE to the list of reserved beams. Although this disclosure describes determining a subset of the plurality of UEs that maximizes an estimated system capacity for the RBG in a particular manner, this disclosure contemplates determining a subset of the plurality of UEs that maximizes an estimated system capacity for the RBG in any suitable manner.

In particular embodiments, the UE grouping/scheduling unit 623A may also add k adjacent beams to the beam with the highest strength for the UE to the list of reserved beams in order to avoid interferences caused by an oversampling, where k may be an oversampling factor. The UE grouping/scheduling unit 623A may add k/2 adjacent beams in each side of the beam with the highest strength to the list of reserved beams. Although this disclosure describes avoiding interferences caused by an oversampling in a particular manner, this disclosure contemplates avoiding interferences caused by an oversampling in any suitable manner.

In particular embodiments, the UE grouping/scheduling unit 623A may add n beams with next highest strength for the UE beyond the beam with the highest strength for the UE to the list of reserved beams to mitigate this type of interferences. The L1 621 may need to convey information regarding the n beams for the UE to the L2 623 at step 653 for this feature. Although this disclosure describes avoiding interferences caused by secondary beams in a particular manner, this disclosure contemplates avoiding interferences caused by secondary beams in any suitable manner.

In particular embodiments, the UE grouping/scheduling unit 623A may repeatedly determine in a loop whether adding the candidate UE to the candidate set decreases an estimated system capacity for UEs in the candidate set. The UE grouping/scheduling unit 623A may define a temporary set as UEs in the candidate set and the candidate UE. The UE grouping/scheduling unit 623A may adjust a transmission signal power based on a number of UEs in the temporary set. The UE grouping/scheduling unit 623A may calculate an estimated system capacity for UEs in the temporary set based on an assumption that a beam with the highest strength for each UE is used for a transmission. The UE grouping/scheduling unit 623A may determine whether adding the candidate UE to the candidate set decreases an estimated system capacity for the candidate set by comparing the estimated system capacity for UEs in the temporary set and a previously-calculated estimated system capacity for UEs in the candidate set. Although this disclosure describes determining whether adding the candidate UE to the candidate set decreases an estimated system capacity for UEs in the candidate set in a particular manner, this disclosure contemplates determining whether adding the candidate UE to the candidate set decreases an estimated system capacity for UEs in the candidate set in any suitable manner.

In particular embodiments, at step 654, the L2 623 may convey the information regarding the selected subset of the plurality of UEs for the RBG and a number of layers for each of the UEs per TTI to the L1 611 over an L1/L2 interface.

In particular embodiments, a precoder calculation unit 621C of the L1 in the DU 620 may compute a precoding matrix for the RBG based on the selected subset. The precoder calculation unit 621C may establish a massive MIMO (maMIMO) channel matrix between UEs in the selected subset and transmission antenna ports associated with the gNB based on the SRS-based channel estimates. The precoder calculation unit 621C may calculate a regularized pseudo-inverse of the maMIMO channel matrix. The precoder calculation unit 621C may obtain a regularized zero forcing (RZF) precoding matrix by normalizing power of each column of the regularized pseudo-inverse of the maMIMO channel matrix. As a result of the normalizing, a transmit power level for each UE in the selected subset may equal to each other. Although this disclosure describes computing a precoding matrix for the RBG in a particular manner, this disclosure computing a precoding matrix for the RBG in any suitable manner.

In particular embodiments, at step 655, the L1 621 may convey the computed precoding matrix to the L2 623 over the L1/L2 interface.

In particular embodiments, a link adaptation unit 623B of the L1 623 in the DU 620 may determine MCS for each of the plurality of UEs 605 for the TTI. The link adaptation unit 623B may calculate an initial MCS as a function of an effective SINR (subject to an upper limit set by CQI) for a UE. The link adaptation unit 623B may determine a Transport Block (TB) size as a function of the initial MCS and a number of resource blocks allocated to the UE. The link adaptation unit 623B may adjust the effective SINR based on HARQ responses acquired from the downlink traffic information unit 623C. The link adaptation unit 623B may optimize the MCS in a recursive fashion while sticking to a BLER target. Although this disclosure describes determining MCS for each of the plurality of UEs for the TTI in a particular manner, this disclosure contemplates determining MCS for each of the plurality of UEs for the TTI in any suitable manner.

In particular embodiments, at step 656, the L2 623 may convey the determined MCS for each of the UEs per TTI to the L1 621.

In particular embodiments, a codeword generation/layer mapping unit 621D of the L2 621 in the DU 620 may prepare multi-layered UE data for the RBG based on the selected subset of the plurality of UEs, the computed precoding matrix, the determined MCS, and a number of layers for each of the plurality of UEs. For preparing multi-layered UE data for the RBG, the codeword generation/layer mapping unit 621D may generate codewords using information associated with the selected subset of the plurality of UEs, the determined MCS value for each of the plurality of UEs, and the number of layers for each of the plurality of UEs. The codeword generation/layer mapping unit 621D may map user data onto layers allocated to the UE for each of the plurality of UEs based on the computed precoding matrix. Although this disclosure describes preparing multi-layered UE data for the RBG in a particular manner, this disclosure contemplates preparing multi-layered UE data for the RBG in any suitable manner.

In particular embodiments, at step 657, the L1 621 may send the multi-layered UE data and the precoding matrix for the RBG to the RU 210 over the fronthaul 115.

In particular embodiments, a precoding unit 615 of the RU 610 may perform a precoding on the multi-layered UE data using the precoding matrix. The RU 210 may transmit pre-coded multi-layered UE data to UEs 605 in the selected subset for the RBG using MU-MIMO technologies.

Although this disclosure describes transmitting UE data to the UEs in a selected subset of plurality of UEs using MU-MIMO technologies in a particular manner, this disclosure contemplates transmitting UE data to the UEs in a selected subset of plurality of UEs using MU-MIMO technologies in any suitable manner.

Figure 7:
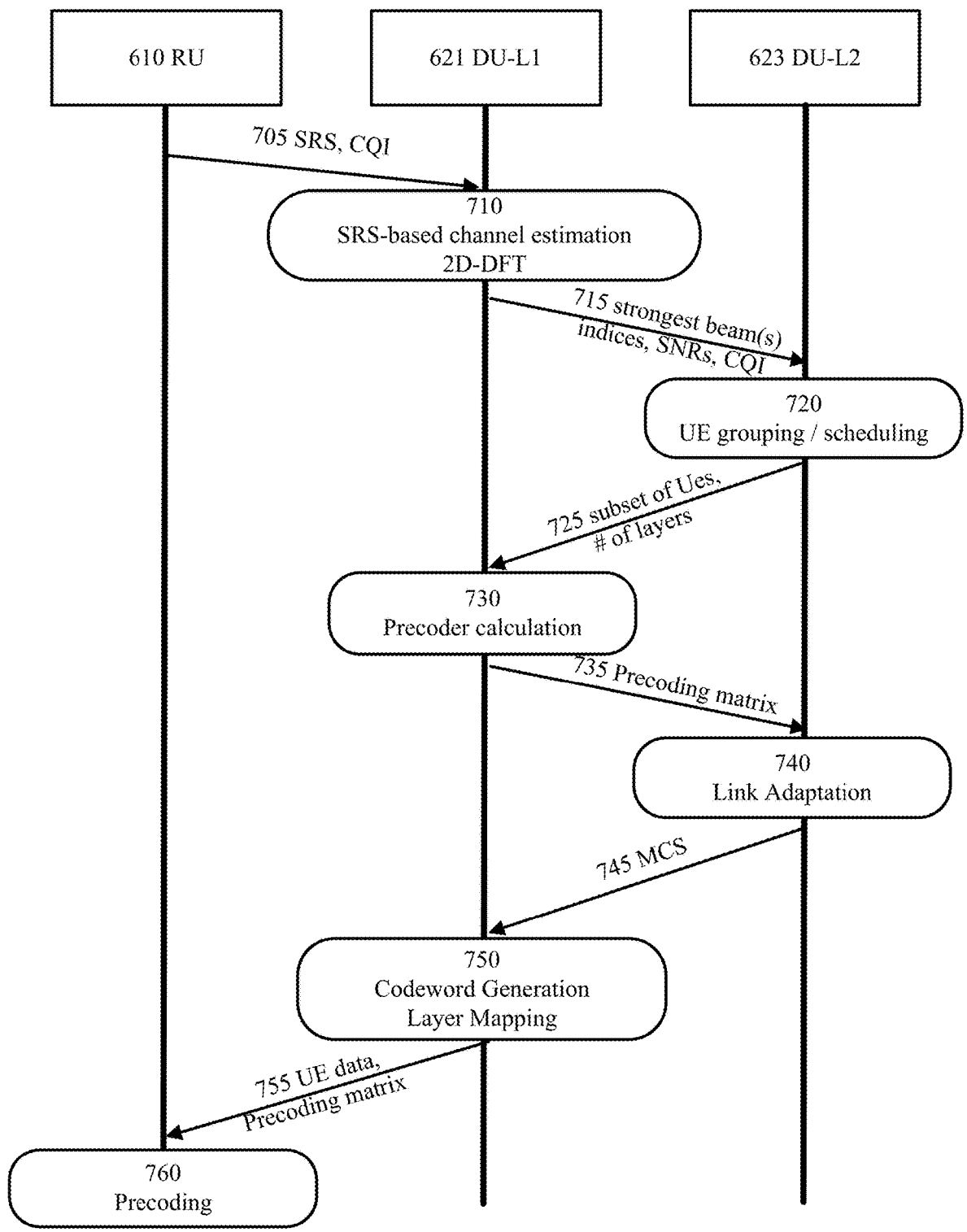
FIG. 7 illustrates an example flow for 2D-DFT+RZF-based user grouping for downlink MU-MIMO.

FIG. 7 illustrates an example flow for 2D-DFT+RZF-based user grouping for downlink MU-MIMO. At step 705, the RU 610 may send SRS and CQI received from the plurality of UEs 605 to the L1 621 of the DU 620. At step 710, the L1 621 may compute a channel matrix for each of the plurality of UEs 605 based on the SRS and estimate strengths or SNRs of a plurality of pre-determined beams for the UE by performing 2D-DFT on the channel matrix. At step 715, the L1 621 may convey information regarding one or more beams with highest strength for each UE and their corresponding SNRs, and CQIs to the L2 623 of the DU 620. At step 720, the L2 623 may perform the user grouping/scheduling based on the received information regarding the one or more beams with highest strength, their corresponding SNRs, CQIs and downlink traffic information for each UE. At step 725, the L2 623 may convey information regarding the selected subset of UEs for the RBG and a number of layers for each of the UEs per TTI to the L1 621. At step 730, the L1 621 may compute a precoding matrix for the RBG based on the selected subset. At step 735, the L1 621 may convey the computed precoding matrix to the L2 623. At step 740, the L2 623 may perform a link adaptation procedure to determine MCS for each of the plurality of UEs per TTI. At step 745, the L2 623 may convey the MCS for each UE per TTI to the L1 621. At step 750, the L1 621 may perform the codeword generation and layer mapping. At step 755, the L1 621 may send the multi-layered UE data and the precoding matrix to the RU 610. At step 760, the RU 610 may perform precoding on the multi-layered UE data using the precoding matrix. The RU 610 may send the pre-coded UE data to the UEs in the selected subset for the RBG. Although this disclosure describes a particular flow for downlink MU-MIMO downlink based on the 2D-DFT+RZF-based user group algorithm, this disclosure contemplates any suitable flow for downlink MU-MIMO downlink based on the 2D-DFT+RZF-based user group algorithm.

Figure 8:
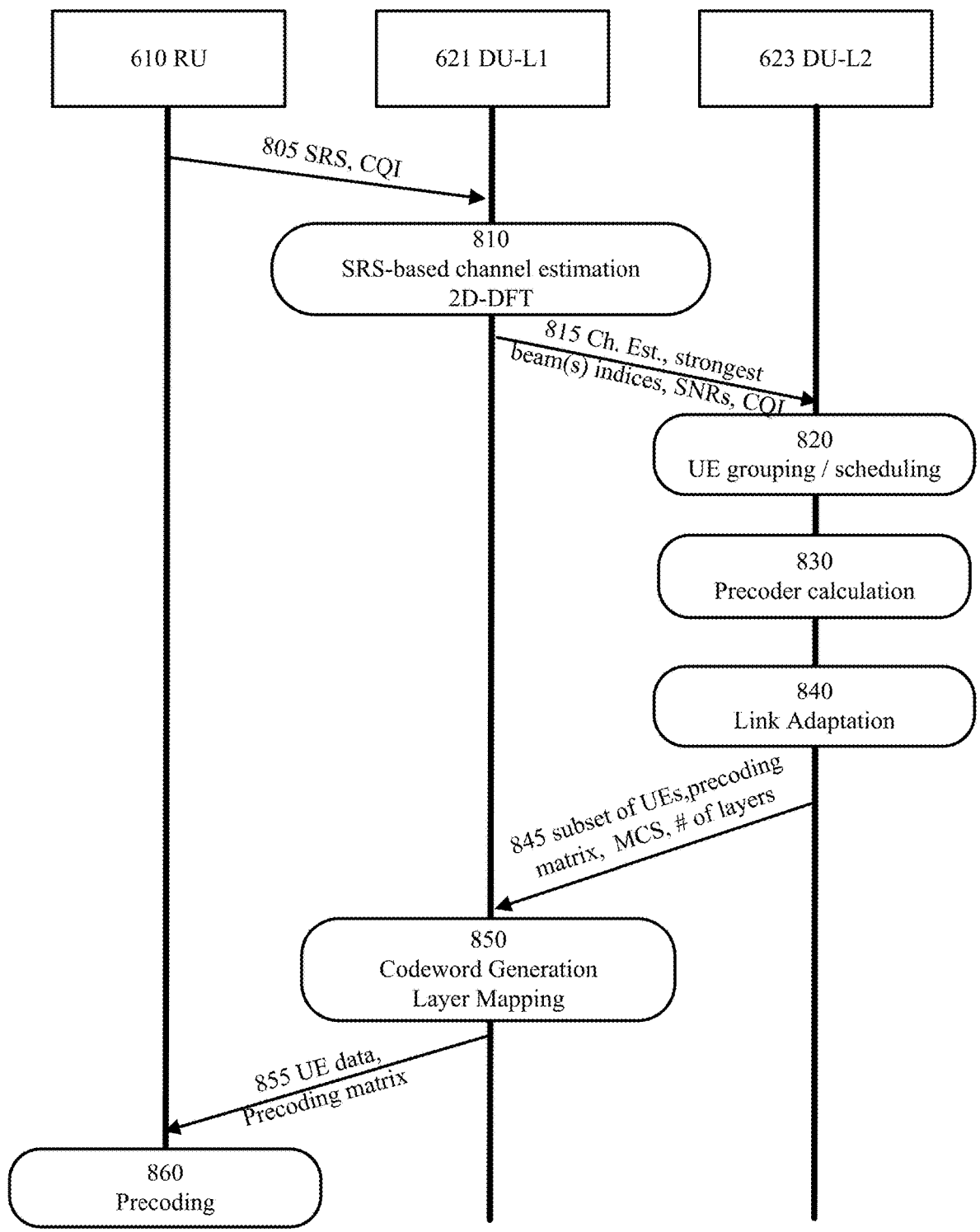
FIG. 8 illustrates an example alternative flow for 2D-DFT+RZF-based user grouping for downlink MU-MIMO.

In the flow illustrated in FIG. 7, a number of data exchanges are introduced between the L1 621 and the L2 623 because the L1 calculates the precoding matrix. The number of data exchanges may be reduced at a cost of conveying channel estimates from the L1 to L2. Then, the L2 may have sufficient information for establishing a maMIMO matrix between the UEs in the selected subset and transmission antenna ports associated with the gNB. The L2 may be able to calculate the precoding matrix by performing an RZF on the maMIMO. FIG. 8 illustrates an example alternative flow for 2D-DFT+RZF-based user grouping for downlink MU-MIMO. At step 805, the RU 610 may send SRS and CQI received from the plurality of UEs 605 to the L1 621 of the DU 620. At step 810, the L1 621 may compute a channel matrix for each of the plurality of UEs 605 based on the SRS and estimate strengths or SNRs of a plurality of pre-determined beams for the UE by performing 2D-DFT on the channel matrix. At step 815, the L1 621 may convey information regarding one or more beams with highest strength for each UE and their corresponding SNRs, and CQIs to the L2 623 of the DU 620. The L1 621 may also convey the channel estimates (in forms of channel matrices) for all of the plurality of UEs. At step 820, the L2 623 may perform the user grouping/scheduling based on the received information regarding the one or more beams with highest strength, their corresponding SNRs, CQIs and downlink traffic information for each UE. At step 830, the L2 623 may compute a precoding matrix for the RBG based on the selected subset by performing an RZF on a maMIMO matrix between the UEs in the selected subset and transmission antenna ports associated with the gNB. At step 840, the L2 623 may perform a link adaptation procedure to determine MCS for each of the plurality of UEs per TTI. At step 845, the L2 623 may convey information regarding the selected subset of UEs and the computed precoding matrix for the RBG to the L1 621. The L2 623 may also convey the MCS and a number of layers for each UE per TTI to the L1 621. At step 850, the L1 621 may perform the codeword generation and layer mapping. At step 855, the L1 621 may send the multi-layered UE data and the precoding matrix to the RU 610. At step 860, the RU 610 may perform precoding on the multi-layered UE data using the precoding matrix. The RU 610 may send the pre-coded UE data to the UEs in the selected subset for the RBG. Although this disclosure describes a particular flow for downlink MU-MIMO downlink based on the 2D-DFT+RZF-based user group algorithm, this disclosure contemplates any suitable flow for downlink MU-MIMO downlink based on the 2D-DFT+RZF-based user group algorithm.

RZF of IDFT

Another alternative optimization algorithm, Regularized Zero Forcing IDFT vectors of the selected UEs, may select a subset of UEs for an RBG in a same manner with the 2D-DFT-based user grouping algorithm. The RU 110 may establish a maMIMO channel matrix by conjugating DFT vectors corresponding to the subset of UEs. The conjugated DFT vectors are IDFT vectors of the DFT vectors. The RU 110 may compute a precoding matrix by performing an RZF on the maMIMO channel matrix. The RU 110 may not need to have channel knowledge for computing the precoding matrix. The algorithm may be particularly effective for high level of DFT oversampling, where significant level of interference between the DFT vectors of the UEs in the selected subset. A computational complexity for this alternative algorithm may be slightly higher than the 2D-DFT-based user grouping algorithm. Also, the amount of data transferred over the fronthaul 115 may be identical to that of the 2D-DFT-based user grouping algorithm. But the performance gain may be significant in many cases.

In particular embodiments, an RU 110 associated with a gNB may comprise one or more computing devices. The RU 110 may receive SRS from a plurality of UEs associated with the gNB. The RU may send the SRS to a DU 120 associated with the gNB. The DU 120 may compute an SRS-based channel matrix for each of the plurality of UEs by performing SRS-based downlink channel estimations with the received SRS. The DU 120 may estimate strengths or SNRs for a plurality of pre-determined beams for each of the plurality of UEs by performing a 2D-DFT on the SRS-based channel matrix for each of the plurality of UEs. The DU 120 may select a subset of the plurality of UEs to which downlink data is to be transmitted for an RBG in a TTI. The subset may be selected based on the estimated strengths or SNRs of the plurality of pre-determined beams, the CQIs, and downlink traffic information associated with each of the plurality of UEs. The DU 120 may determine modulation and coding scheme (MCS) for each of the plurality of UEs for the TTI. The DU 120 may associate a beam to each UE in the selected subset for the RBG. The associated beam for a UE is a beam with a highest strength for the UE. The RU 110 may receive information regarding the selected subset, the beams associated with UEs in the selected subset, and data to be transmitted to the UEs in the selected subset from the DU 120. The RU 110 may establish a maMIMO channel matrix by calculating the IDFT of the DFT vectors corresponding to the beams associated with the UEs in the selected subset. The RU 110 may compute a precoding matrix for the RBG by RZF-ing the maMIMO matrix. The RU 110 may prepare pre-coded multi-user data by applying the precoding matrix to the UE data. The RU 110 may transmit the pre-coded data to the UEs in the selected subset for the RBG using MU-MIMO technologies. Although this disclosure describes computing a precoding matrix based on IDFT vectors corresponding to UEs in the selected subset for downlink MU-MIMO in a particular manner, this disclosure contemplates computing a precoding matrix based on IDFT vectors corresponding to UEs in the selected subset for downlink MU-MIMO in any suitable manner.

Figure 9:
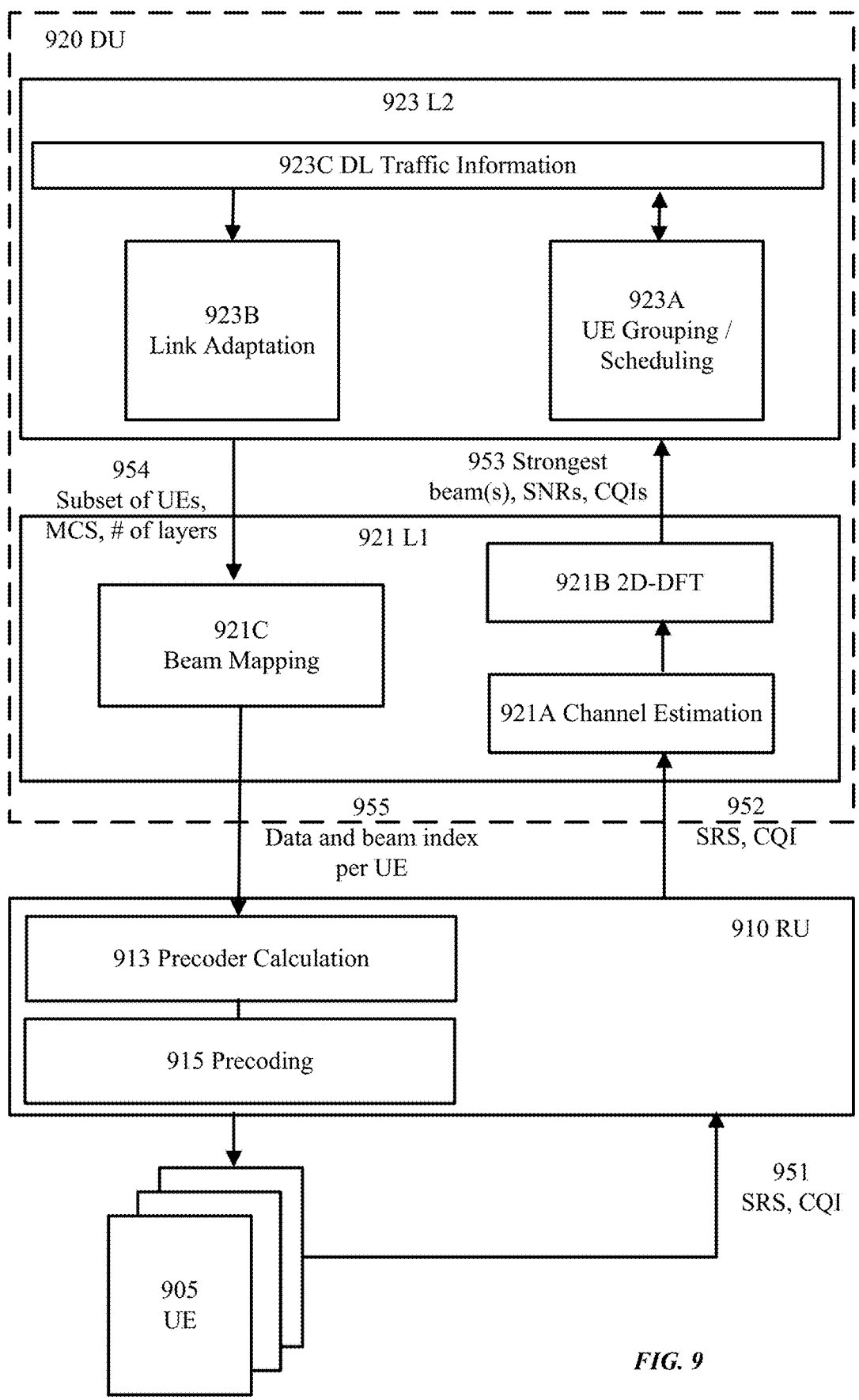
FIG. 9 illustrates an example logical structure for computing a precoding matrix based on IDFT vectors corresponding to UEs in the selected subset for downlink MU-MIMO.

FIG. 9 illustrates an example logical structure for computing a precoding matrix based on IDFT vectors corresponding to UEs in the selected subset for downlink MU-MIMO. In particular embodiments, an RU 910 associated with a gNB may receive SRS from a plurality of UEs 905 associated with the gNB at step 951. At step 952, L1 921 of the DU 920 may receive SRS from the RU 910. The RU 910 may also receive CQIs from the plurality of UEs 905 at step 951. At step 952, the L1 921 may also receive the CQIs from the RU 910.

In particular embodiments, the channel estimation unit 921A of the L1 921 of the DU 920 may compute a channel matrix for each of the plurality of UEs 905 by performing SRS-based downlink channel estimations with the received SRS. The channel matrix may be between an antenna array for the UE 905 and an antenna array for the gNB. An SRS-based downlink channel estimation may be an SRS-based least squares channel estimation. Although this disclosure describes computing a channel matrix for a UE in a particular manner, this disclosure contemplates computing a channel matrix for a UE in any suitable manner.

In particular embodiments, a 2D-DFT unit 921B of the L1 921 in the DU 920 may estimate strengths or SNRs for a plurality of pre-determined beams for each of the plurality of UEs based on the computed channel matrices. The 2D-DFT unit 921B may perform a 2D-DFT on the channel matrix for the UE to estimate strengths or SNRs for the plurality of pre-determined beams. As the channel matrix may be between an antenna array for the UE 905 and an antenna array for the gNB, the antenna array size may play a direct role in a beam resolution. The 2D-DFT unit 921B may perform oversampling of DFT vectors for better granularity. Although this disclosure describes estimating strengths or SNRs for a plurality of pre-determined beams for a UE in a particular manner, this disclosure contemplates estimating strengths or SNRs for a plurality of pre-determined beams for a UE in any suitable manner.

In particular embodiments, at step 953, the L1 921 may convey indices of one or more beams with highest strength and their corresponding SNRs, and CQI for each of the plurality of UEs 905 to the L2 923 over an L1/L2 interface.

In particular embodiments, the L2 923 may select a subset of the plurality of UEs to which downlink data is to be transmitted for a RBG in a TTI based on the one or more beams with highest strength and their corresponding SNRs, the CQIs, and downlink traffic information associated with each of the plurality of UEs. The downlink traffic information associated with a UE 905 may comprise traffic class type, HARQ retransmission information, and any pre-scheduled persistent or semi-persistent transmission allocations. A downlink traffic information unit 923C may comprise downlink UE traffic queues and an HARQ module. Although this disclosure describes selecting a subset of the plurality of UEs to which downlink data is to be transmitted for a RBG in a TTI in a particular manner, this disclosure contemplates selecting a subset of the plurality of UEs to which downlink data is to be transmitted for a RBG in a TTI in any suitable manner.

In particular embodiments, a UE grouping/scheduling unit 923A of the L2 923 in the DU 920 may calculate a user selection metric for each of the plurality of UEs. In particular embodiments, the user selection metric may comprise a proportional fair metric. Calculating a PF metric for a UE may be based on a beam with the highest strength for the UE and its corresponding SNR, and the downlink traffic information associated with the UE. Although this disclosure describes calculating a user selection metric for a UE in a particular manner, this disclosure contemplates calculating a user selection metric for a UE in any suitable manner.

In particular embodiments, the UE grouping/scheduling unit 923A may determine a subset of the plurality of UEs that maximizes an estimated system capacity for the RBG. The UE grouping/scheduling unit 923A may sort the plurality of UEs 905 based on their corresponding PF metrics. The UE grouping/scheduling unit 923A may prepare an empty candidate set. The UE grouping/scheduling unit 923A may prepare an empty list of reserved beams. The UE grouping/scheduling unit 923A may add the first UE among the sorted UEs into the candidate set. The UE grouping/scheduling unit 923A may repeat removing a first UE from the sorted UEs as a candidate UE and adding the candidate UE into the candidate set when (1) a beam with the highest strength for the candidate UE is not in the list of reserved beams and (2) adding the candidate UE to the candidate set is determined not to decrease the estimated system capacity for UEs in the candidate set. The UE grouping/scheduling unit 923A may stop the repetition when a finishing condition is met. The finishing condition may comprise a size of the candidate set reaches a pre-determined size, or no more UE exists in the sorted UEs. Adding a UE into the candidate set may comprise adding a beam with the highest strength for the UE to the list of reserved beams. Although this disclosure describes determining a subset of the plurality of UEs that maximizes an estimated system capacity for the RBG in a particular manner, this disclosure contemplates determining a subset of the plurality of UEs that maximizes an estimated system capacity for the RBG in any suitable manner.

In particular embodiments, the UE grouping/scheduling unit 923A may also add k adjacent beams to the beam with the highest strength for the UE to the list of reserved beams to avoid interferences caused by an oversampling, where k may be an oversampling factor. The UE grouping/scheduling unit 923A may add k/2 adjacent beams in each side of the beam with the highest strength to the list of reserved beams. Although this disclosure describes avoiding interferences caused by an oversampling in a particular manner, this disclosure contemplates avoiding interferences caused by an oversampling in any suitable manner.

In particular embodiments, the UE grouping/scheduling unit 923A may add n beams with next highest strength for the UE beyond the beam with the highest strength for the UE to the list of reserved beams to mitigate interferences caused by secondary beams. The L1 221 may need to convey information regarding the n beams for the UE to the L2 223 at step 953 for this feature. Although this disclosure describes avoiding interferences caused by secondary beams in a particular manner, this disclosure contemplates avoiding interferences caused by secondary beams in any suitable manner.

In particular embodiments, the UE grouping/scheduling unit 923A may repeatedly determine in a loop whether adding the candidate UE to the candidate set decreases an estimated system capacity for UEs in the candidate set. The UE grouping/scheduling unit 923A may define a temporary set as UEs in the candidate set and the candidate UE. The UE grouping/scheduling unit 923A may adjust a transmission signal power based on a number of UEs in the temporary set. The UE grouping/scheduling unit 923A may calculate an estimated system capacity for UEs in the temporary set based on an assumption that a beam with the highest strength for each UE is used for a transmission. The UE grouping/scheduling unit 923A may determine whether adding the candidate UE to the candidate set decreases an estimated system capacity for the candidate set by comparing the estimated system capacity for UEs in the temporary set and a previously-calculated estimated system capacity for UEs in the candidate set. Although this disclosure describes determining whether adding the candidate UE to the candidate set decreases an estimated system capacity for UEs in the candidate set in a particular manner, this disclosure contemplates determining whether adding the candidate UE to the candidate set decreases an estimated system capacity for UEs in the candidate set in any suitable manner.

In particular embodiments, a link adaptation unit 923B of the L1 923 in the DU 920 may determine MCS for each of the plurality of UEs 905 for the TTI. The link adaptation unit 923B may calculate an initial MCS as a function of an effective SINR (subject to an upper limit set by CQI) for a UE. The link adaptation unit 923B may determine a Transport Block (TB) size as a function of the initial MCS and a number of resource blocks allocated to the UE. The link adaptation unit 923B may adjust the effective SINR based on HARQ responses acquired from the downlink traffic information unit 923C. The link adaptation unit 923B may optimize the MCS in a recursive fashion while sticking to a BLER target. Although this disclosure describes determining MCS for each of the plurality of UEs for the TTI in a particular manner, this disclosure contemplates determining MCS for each of the plurality of UEs for the TTI in any suitable manner.

In particular embodiments, at step 954, the L2 923 may convey the selected subset of UEs per RBG to the L1 921. The L2 923 may also convey the determined MCS and a number of layers for each of the UEs per TTI to the L1 921.

In particular embodiments, a beam mapping unit 921C of the L1 921 in the DU 920 may associate a beam to each UE in the selected subset for the RBG. The associated beam for a UE is a beam with the highest strength for the UE. Although this disclosure describes mapping a beam to a UE in a particular manner, this disclosure contemplates mapping a beam to a UE in any suitable manner.

In particular embodiments, at step 955, the L1 921 may send information regarding the selected subset for the RBG, multi-user data to be transmitted to UEs in the selected subset, and identities of selected beams among a plurality of pre-determined beams to be associated with the UEs in the subset to RU 910 over the fronthaul 115. Each of the plurality of pre-determined beams may correspond to a discrete Fourier transform (DFT) vector.

In particular embodiments, a precoding calculation unit 913 of the RU 910 may compute a precoding matrix for the RBG based on inverse-DFT (IDFT) vectors corresponding to the selected beams. The precoding calculation unit 913 may establish a maMIMO channel matrix by calculating the IDFT of the DFT vectors corresponding to the selected beams. Calculating an IDFT of a DFT vector may be calculating a complex conjugate of the DFT vector. The precoding calculation unit 913 may calculate a regularized pseudo-inverse of the maMIMO channel matrix. The precoding calculation unit 913 may normalize power of each column of the regularized pseudo-inverse of the maMIMO channel matrix such that a transmit power level for each UE in the selected subset equals to each other. Although this disclosure describes computing a precoding matrix for an RBG based on IDFT vectors corresponding to the selected beams in a particular manner, this disclosure contemplates computing a precoding matrix for an RBG based on IDFT vectors corresponding to the selected beams in any suitable manner.

In particular embodiments, a precoding unit 915 of the RU 910 may perform a precoding on the multi-user data using the computed precoding matrix. The RU 910 may transmit pre-coded multi-user data to UEs 205 in the selected subset for the RBG using MU-MIMO technologies. Although this disclosure describes transmitting user data to the UEs in a selected subset of plurality of UEs using MU-MIMO technologies in a particular manner, this disclosure contemplates transmitting user data to the UEs in a selected subset of plurality of UEs using MU-MIMO technologies in any suitable manner.

Figure 10A:
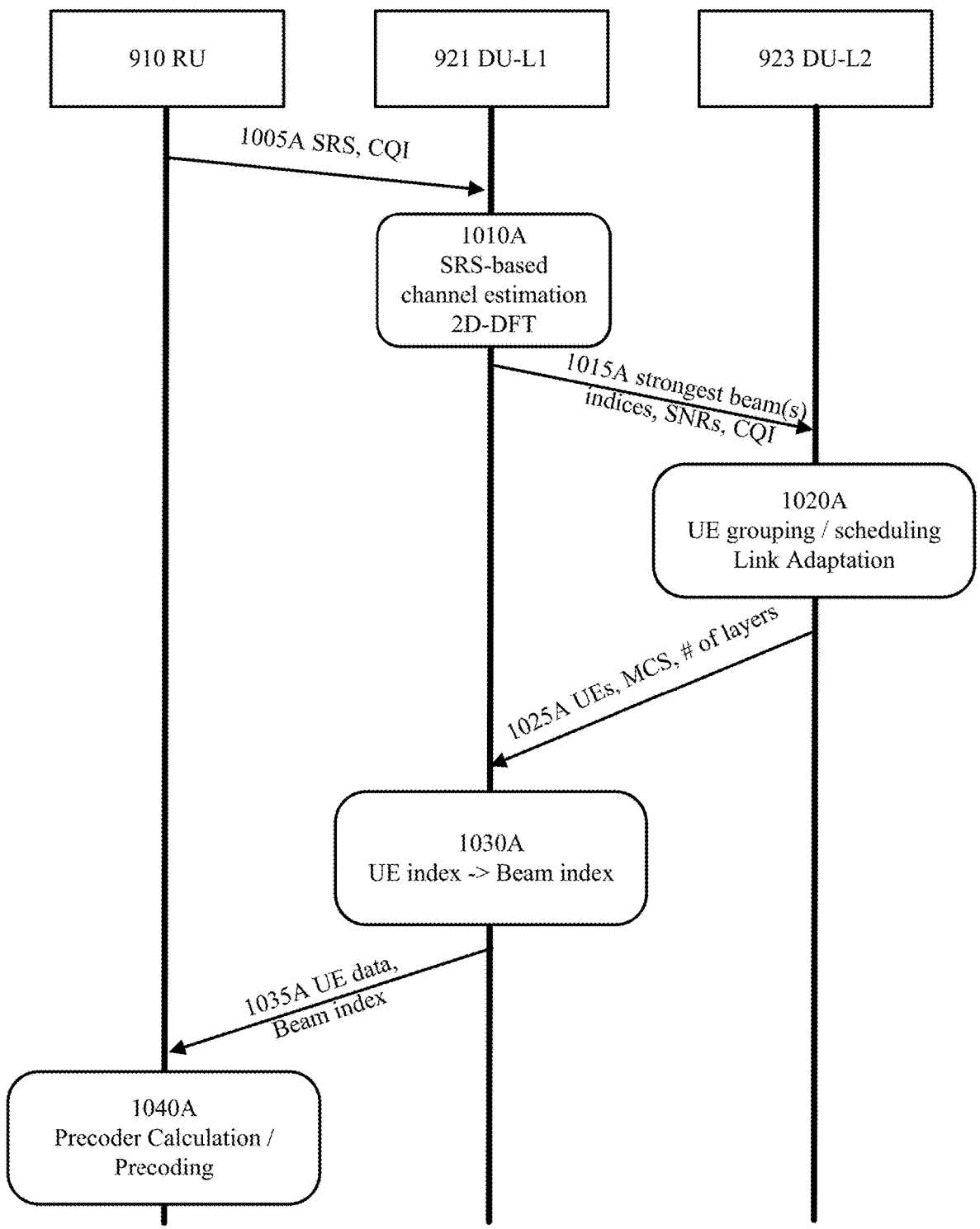
FIG. 10A illustrates an example flow for computing a precoding matrix based on IDFT vectors corresponding to UEs in the selected subset for downlink MU-MIMO.

FIG. 10A illustrates an example flow for computing a precoding matrix based on IDFT vectors corresponding to UEs in the selected subset for downlink MU-MIMO. At step 1005A, the RU 910 may send SRS and CQI received from the plurality of UEs 905 to the L1 921 of the DU 920. At step 1010A, the L1 921 may compute a channel matrix for each of the plurality of UEs 905 based on the SRS and estimate strengths or SNRs of a plurality of pre-determined beams for the UE by performing 2D-DFT on the channel matrix. At step 1015A, the L1 921 may convey information regarding one or more beams with highest strength for each UE and their corresponding SNRs, and CQIs to the L2 923 of the DU 920. At step 1020A, the L2 923 may perform the user grouping/scheduling based on the received information regarding the one or more beams with highest strength, their corresponding SNRs, CQIs and downlink traffic information for each UE. The L2 923 may also perform a link adaptation procedure to determine an MCS value for each UE per TTI. At step 1025A, the L2 923 may convey information regarding the scheduled UEs, determined MCS, and number of layers assigned to each UE to the L1 921. At step 1030A, the L1 921 may map a beam to a UE in the scheduled UEs. At step 1035A, the L1 921 may send the UE data and an index of the beam associated with each UE to the RU 910. At step 1040A, the RU 910 may compute a precoding matrix for the RBG based on IDFT vectors corresponding to the selected beams. The RU 910 may also perform a precoding on the multi-user data using the computed precoding matrix. The RU 910 may send the pre-coded multi-user data to UEs 205 in the selected subset for the RBG using MU-MIMO technologies. Although this disclosure describes a particular flow for computing a precoding matrix based on IDFT vectors corresponding to UEs in the selected subset for downlink MU-MIMO, this disclosure contemplates any suitable flow for computing a precoding matrix based on IDFT vectors corresponding to UEs in the selected subset for downlink MU-MIMO.

Figure 10B:
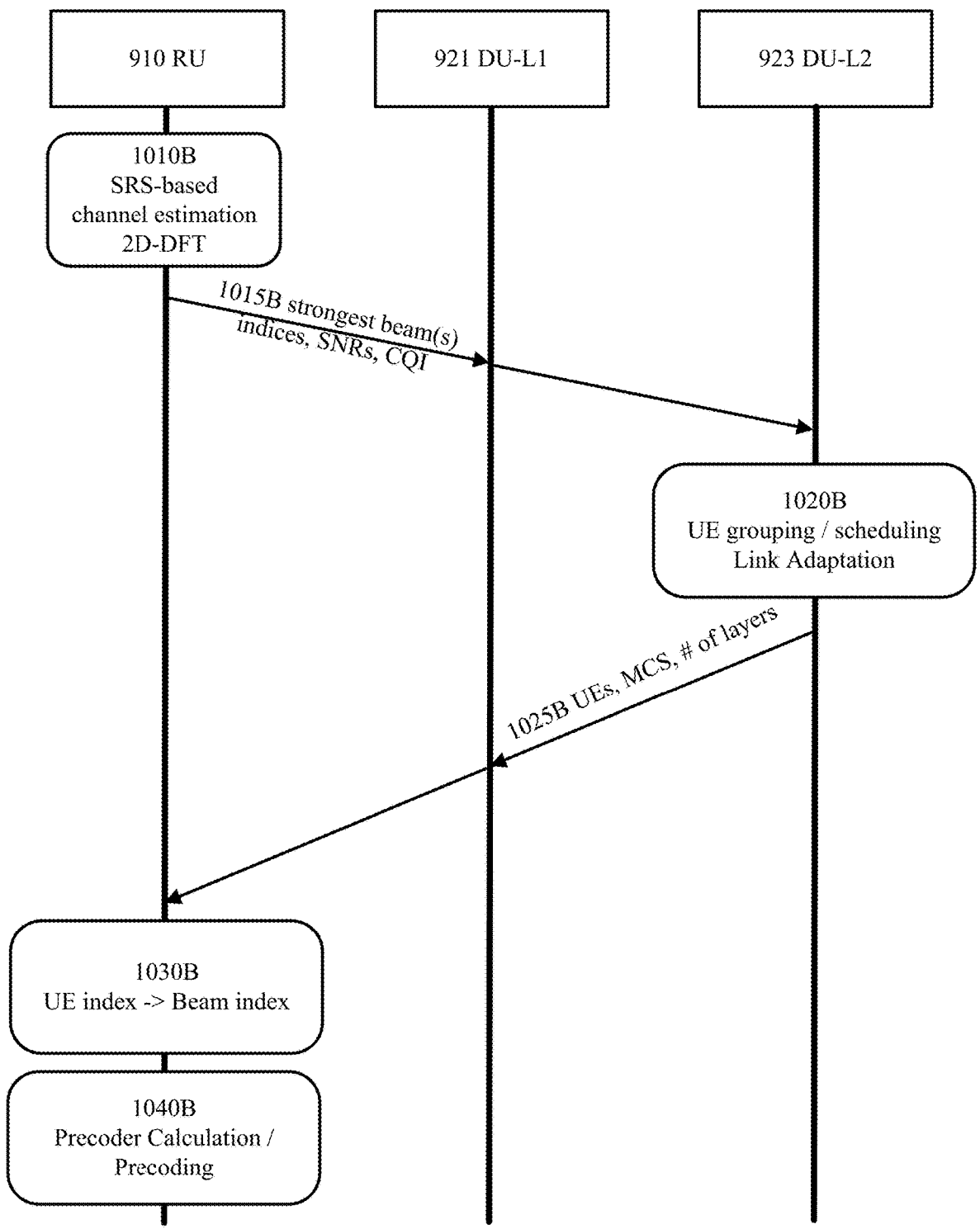
FIG. 10B illustrates an alternative example flow for computing a precoding matrix based on IDFT vectors corresponding to UEs in the selected subset for downlink MU-MIMO.

While computing the precoding matrix by performing RZF on the IDFT vectors of the selected UEs may reduce the requirement on the bandwidth of the fronthaul, the fronthaul bandwidth can be further preserved when the RU 910 computes SRS-based channel matrices for the UEs and selects one or more strongest beams for each UE by performing 2D-DFT on each of the SRS-based channel matrix. Then, the RU 910 may need to send only indices of the one or more strongest beams for each UE instead of whole SRS to the L1 921 of the DU 920. FIG. 10B illustrates an alternative example flow for computing a precoding matrix based on IDFT vectors corresponding to UEs in the selected subset for downlink MU-MIMO. In this alternative flow, the RU 910, instead of the L1 921 of the DU 920, may compute a channel matrix for each of the plurality of UEs 905 and estimate strengths or SNRs of a plurality of pre-determined beams for the UE by performing 2D-DFT on the channel matrix. At step 1010B, the RU 910 may compute a channel matrix for each of the plurality of UEs 905 based on SRS received from each of the plurality of UEs 905 and estimate strengths or SNRs of a plurality of pre-determined beams for the UE by performing 2D-DFT on the channel matrix. At step 1015B, the RU 910 may send information regarding one or more beams with highest strength for each UE and their corresponding SNRs, and CQIs to the L1 921 of the DU 920. The L1 921 may forward the received information to the L2 923 of the DU 920. At step 1020B, the L2 923 may perform the user grouping/scheduling based on the received information regarding the one or more beams with highest strength, their corresponding SNRs, CQIs and downlink traffic information for each UE. The L2 923 may also perform a link adaptation procedure to determine an MCS value for each UE per TTI. At step 1025B, the L2 923 may convey information regarding the scheduled UEs, determined MCS, and number of layers assigned to each UE to the L1 921. The L1 921 may forward the received information to the RU 910. At step 1030B, the RU 910 may map a beam to a UE in the scheduled UEs. At step 1040B, the RU 910 may compute a precoding matrix for the RBG based on IDFT vectors corresponding to the selected beams. The RU 910 may also perform a precoding on the multi-user data using the computed precoding matrix. The RU 910 may send the pre-coded multi-user data to UEs 205 in the selected subset for the RBG using MU-MIMO technologies. Although this disclosure describes a particular flow for computing a precoding matrix based on IDFT vectors corresponding to UEs in the selected subset for downlink MU-MIMO, this disclosure contemplates any suitable flow for computing a precoding matrix based on IDFT vectors corresponding to UEs in the selected subset for downlink MU-MIMO.

Figure 11:
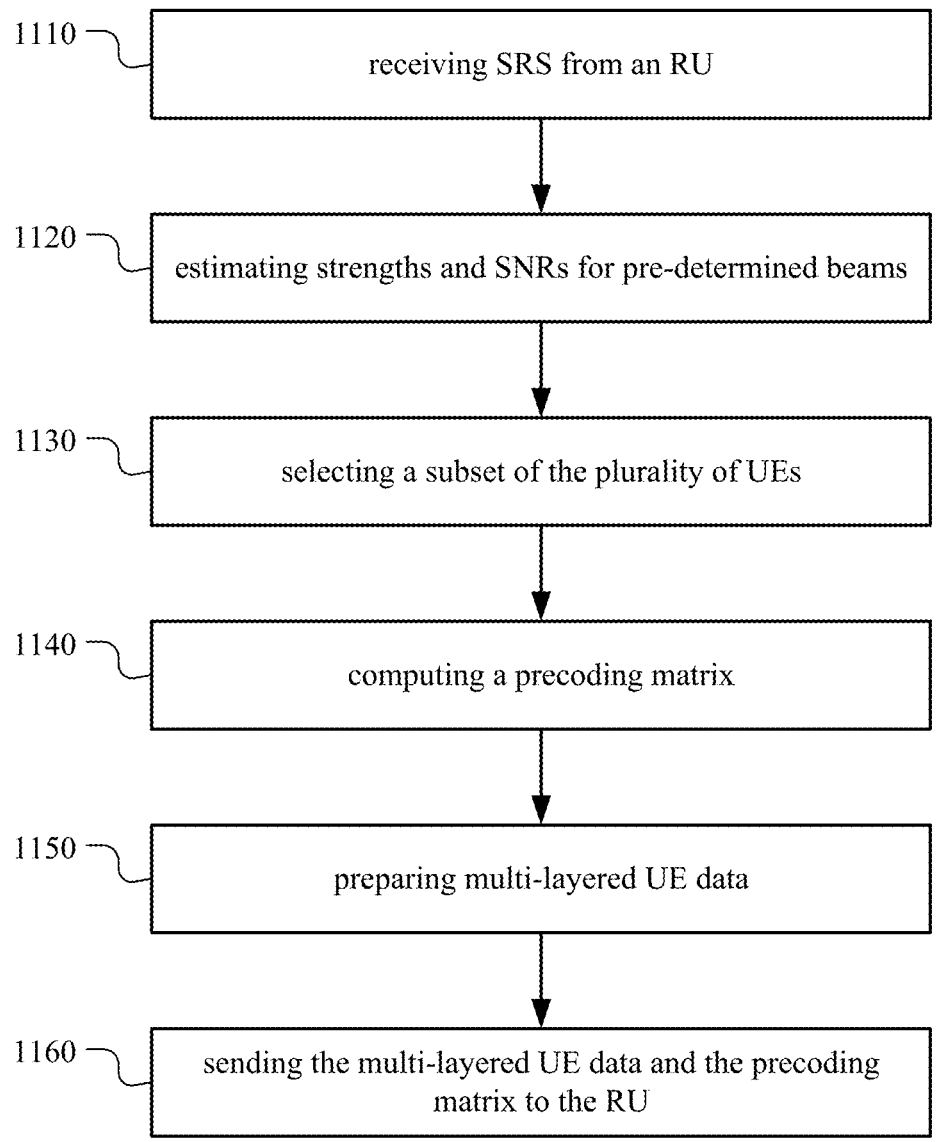
FIG. 11 illustrates an example method 1100 for computing a precoding matrix for downlink MU-MIMO by performing an RZF on a MIMO channel matrix between selected UEs and transmission antenna ports associated with the base station.

FIG. 11 illustrates an example method 1100 for computing a precoding matrix for downlink MU-MIMO by performing an RZF on a MIMO channel matrix between selected UEs and transmission antenna ports associated with the base station. The method may begin at step 1110, where a DU associated with a base station may receive SRS received from a plurality of UEs associated with the base station from an RU associated with the base station. At step 1120, the DU may estimate strengths or SNRs for pre-determined beams for each of the plurality of UEs based on the received SRS. At step 1130, the DU may select a subset of the plurality of UEs to which downlink data is to be transmitted for an RBG in a TTI based on the estimated strengths or SNRs of the pre-determined beams for the plurality of UEs. At step 1140, the DU may compute a precoding matrix for the RBG based on the selected subset. Computing the precoding matrix may comprise establishing a maMIMO channel matrix between UEs in the selected subset and transmission antenna ports associated with the base station, calculating a regularized pseudo-inverse of the maMIMO channel matrix, and normalizing power of each column of the regularized pseudo-inverse of the maMIMO channel matrix. At step 1150, the DU may prepare multi-layered UE data for the RBG based on the selected subset and the computed precoding matrix. At step 1160, the DU may send the multi-layered UE data and the precoding matrix for the RBG to the RU. The RU may transmit pre-coded multi-layered UE data to the UEs in the subset using MIMO technologies. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for computing a precoding matrix for downlink MU-MIMO by performing an RZF on a MIMO channel matrix between selected UEs and transmission antenna ports associated with the base station including the particular steps of the method of FIG. 11, this disclosure contemplates any suitable method for computing a precoding matrix for downlink MU-MIMO by performing an RZF on a MIMO channel matrix between selected UEs and transmission antenna ports associated with the base station including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
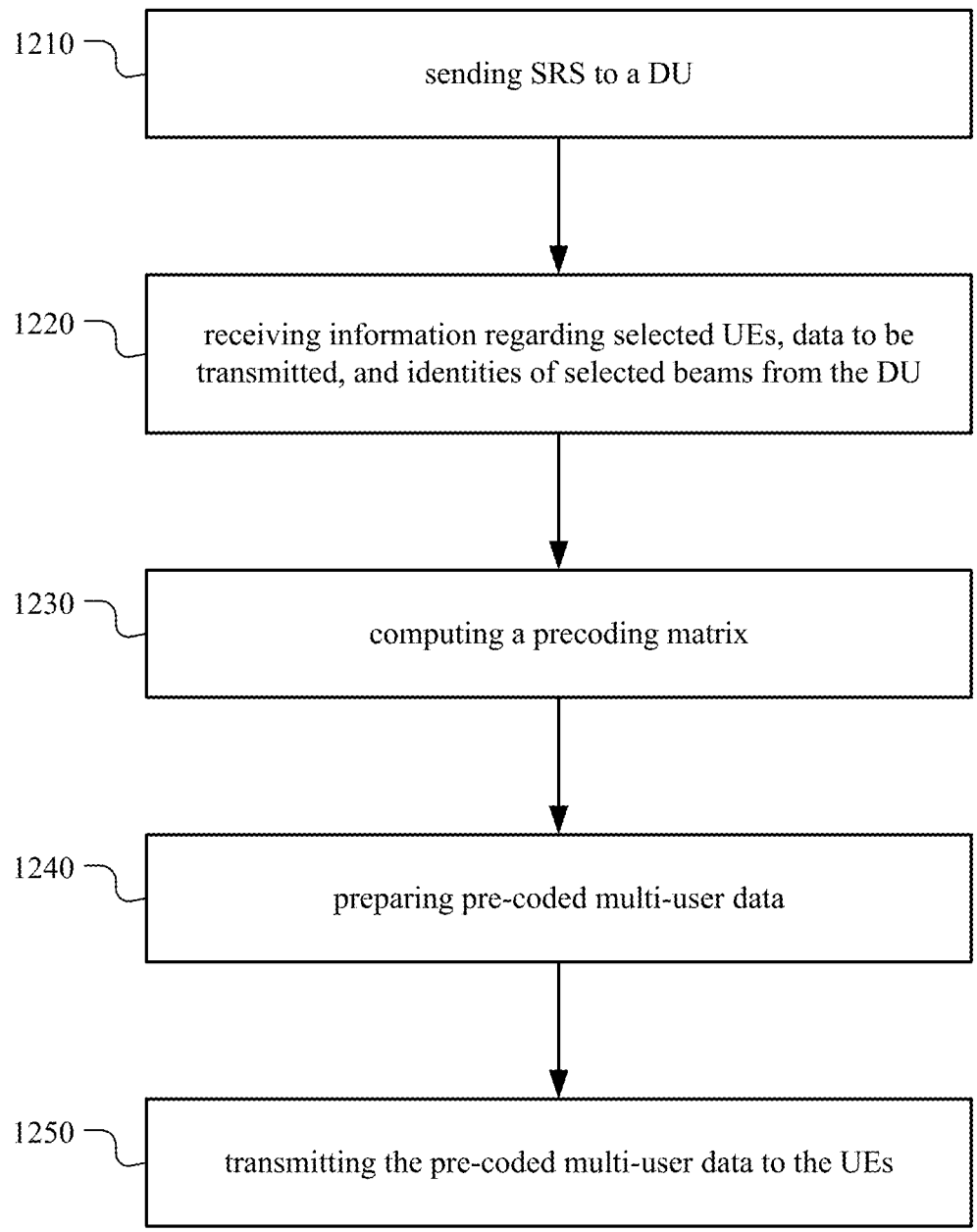
FIG. 12 illustrates an example method 1200 for computing a precoding matrix for downlink MU-MIMO by performing an RZF on a MIMO channel matrix established based on IDFT vectors corresponding to selected beams.

FIG. 12 illustrates an example method 1200 for computing a precoding matrix for downlink MU-MIMO by performing an RZF on a MIMO channel matrix established based on IDFT vectors corresponding to selected beams. The method may begin at step 1210, where an RU may send SRS received from a plurality of UEs associated with the base station to a DU associated with the base station. At step 1220, the RU may receive information regarding a subset of the plurality of UEs selected for downlink data transmissions for an RBG, multi-user data to be transmitted to UEs in the subset, and identities of selected beams among a plurality of pre-determined beams to be associated with the UEs in the subset from the DU. Each of the plurality of pre-determined beams may correspond to a DFT vector. At step 1230, the RU may compute a precoding matrix for the RBG based on IDFT vectors corresponding to the selected beams. At step 1240, the RU may prepare pre-coded multi-user data by applying the precoding matrix to the multi-user data. At 1250, the RU may transmit the pre-coded multi-user data to the UEs in the subset for the RBG using Multiple-Input Multiple-Output (MIMO) technologies. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for computing a precoding matrix for downlink MU-MIMO by performing an RZF on a MIMO channel matrix established based on IDFT vectors corresponding to selected beams including the particular steps of the method of FIG. 12, this disclosure contemplates any suitable method for computing a precoding matrix for downlink MU-MIMO by performing an RZF on a MIMO channel matrix established based on IDFT vectors corresponding to selected beams including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Evaluation

FIG. 13 illustrates example comparisons between the presented L1/L2 cross layer optimization algorithms. The values are computed based on a set of assumptions applied to all the algorithms. For calculations of required complex multiplier-accumulators (CMACs), a number of antenna ports at the base station is assumed to be 64. A size of sliding window that determines a set of potential candidates is assumed to be 16. A number of active UEs associated with the base station is assumed to be 64. A number of UEs to be selected in a subset is assumed to be 16. And, a median number of iterations per layer is assumed to be 3. The RZF-based user grouping algorithm requires the most computations while the 2D-IDF-based user grouping algorithm requires the least computations. Both 2D-DFT+RZF-based algorithm and the RZF of IDFT algorithm require slightly more computations than the 2D-IDF-based user grouping algorithm. Considering that both 2D-DFT+RZF-based algorithm and the RZF of IDFT algorithm are based on the 2D-IDF-based user grouping algorithm, their own computational load would not be high. As for the maximum fronthaul data rate for the algorithms, comparison, the RZF-based user grouping algorithm and the 2D-DFT+RZF-based algorithm requires significantly more fronthaul bandwidth compared to the 2D-IDF-based user grouping algorithm and the RZF of IDFT algorithm. For the RZF-based user grouping algorithm and the 2D-DFT+RZF-based algorithm, the L1 of the DU transmits entire precoder information over the fronthaul while the L1 of the DU, for the 2D-IDF-based user grouping algorithm and the RZF of IDFT algorithm, transmits only index of the selected beam for a UE.

Figure 14:
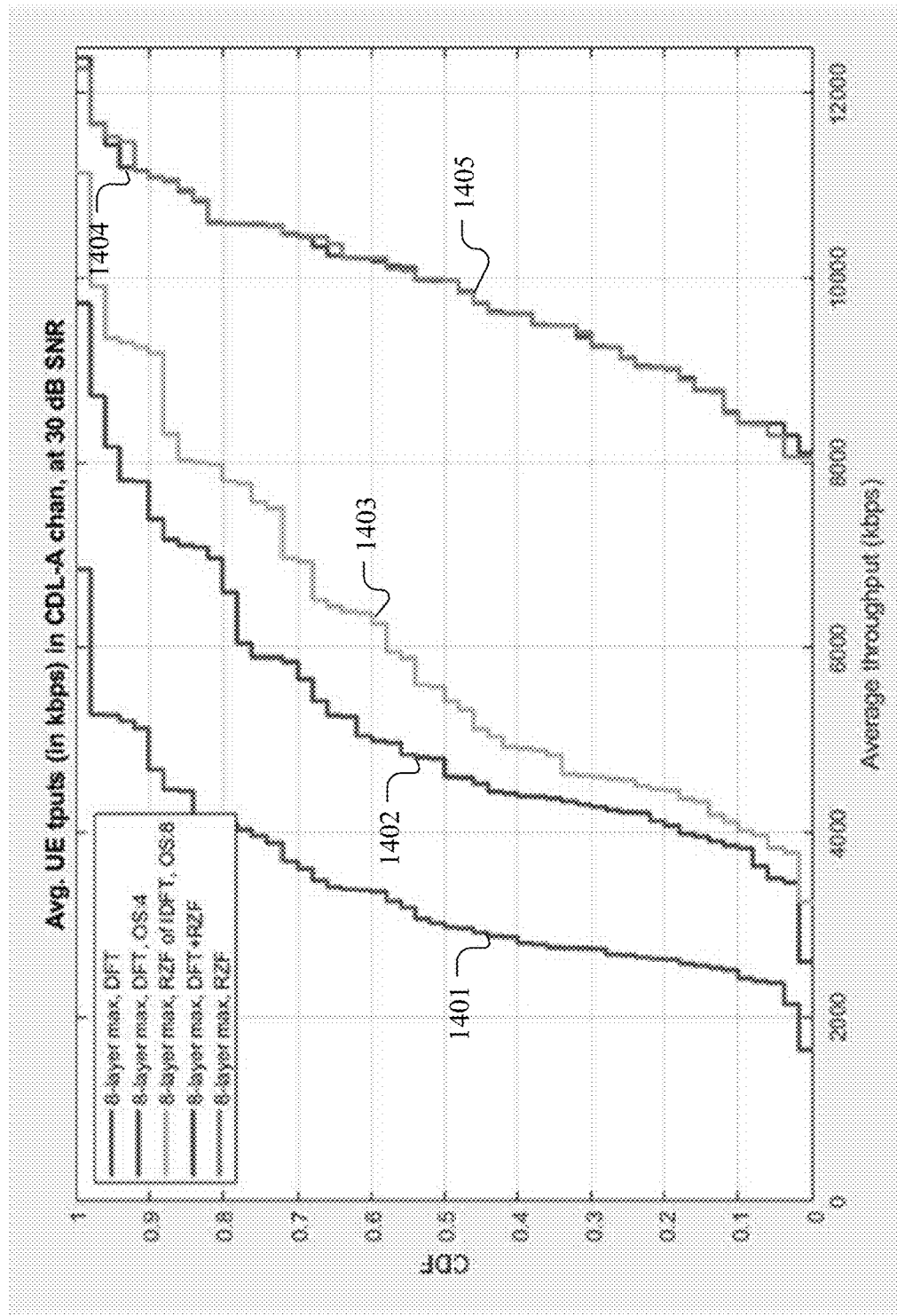
FIG. 14 illustrates example results for simulations comparing performance of the algorithms.

FIG. 14 illustrates example results for simulations comparing performance of the algorithms. In the simulations, clustered delay line (CDL) channel models are employed where each channel path has a certain delay, path gain, as well as an azimuth and elevation of arrival. For the results presented in FIG. 14, CDL-A channel model is utilized. CDF curves indicating the average UE throughput obtained using the 4 algorithms disclosed in this application are plotted. The plots in FIG. 14 are obtained for 30 dB SNR. A plot 1401 indicates the average UE throughput for the 2D-DFT-based user grouping algorithm without oversampling. A plot 1402 indicates the average UE throughput for 2D-DFT-based user grouping algorithm with azimuthal oversampling of 4. A plot 1403 indicates the average UE throughput for RZF of IDFT algorithm with azimuthal oversampling of 8. A plot 1404 indicates the average UE throughput for 2D DFT+RZF algorithm. A plot 1405 indicates the average UE throughput for the RZF-based user grouping algorithm. The 2D-DFT+RZF algorithm achieves comparable throughput to the RZF-based user grouping algorithm while requires much less computations. The RZF of IDFT algorithm requires significantly less computations and smaller bandwidth for the fronthaul between the DU and the RU compared to the RZF-based user grouping algorithm. Considering those resource requirements, the RZF of IDFT algorithm may be useful in certain circumstances.

Systems and Methods

Figure 15:
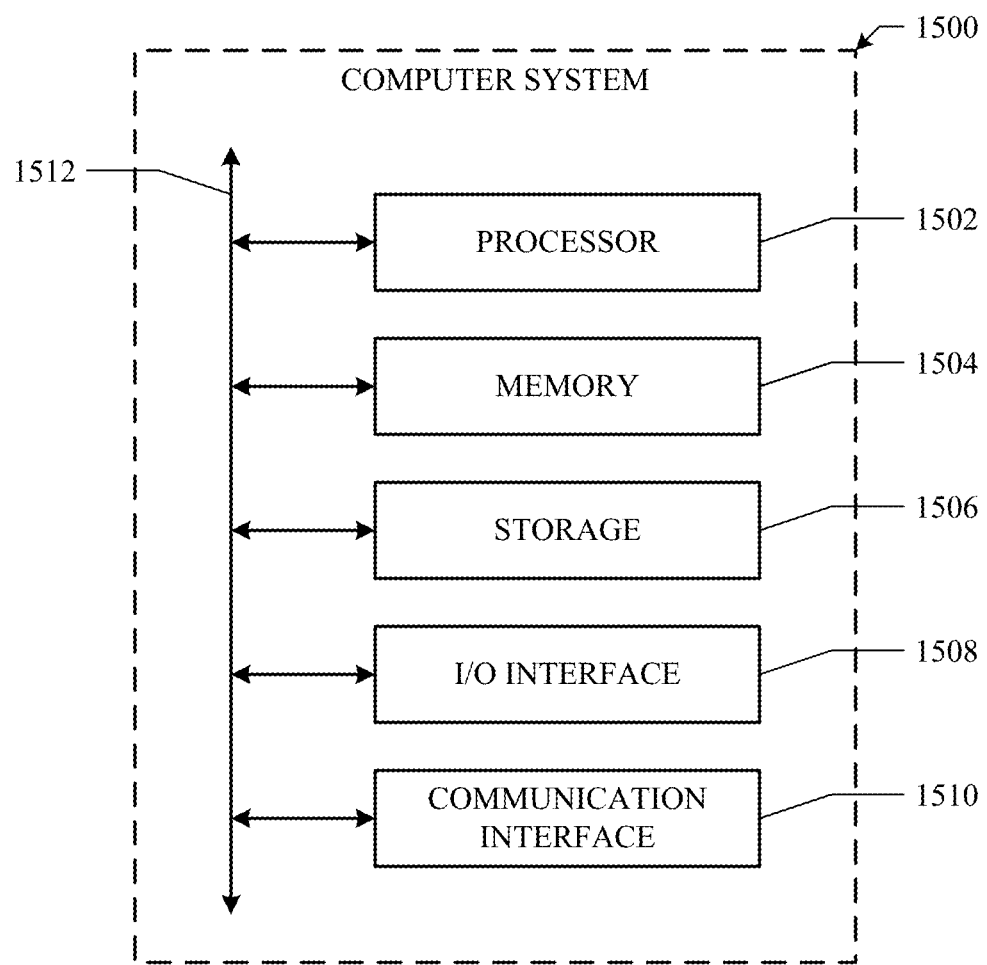
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device associated with a base station of a wireless network:
    receiving, from a plurality of user equipments (UEs) associated with the base station, sounding reference signal (SRS);
    sending, to a distributed unit (DU) associated with the base station, information regarding one or more beams selected for each of the plurality of UEs based on the received SRS;
    receiving, from the DU, information regarding a subset of the plurality of UEs selected for downlink data transmissions for a resource block group (RBG), multi-user data to be transmitted to UEs in the subset, and identities of beams to be associated with the UEs in the subset; and
    transmitting pre-coded multi-user data to the UEs in the subset for the RBG using Multiple-Input Multiple-Output (MIMO) technologies, wherein the pre-coded multi-user data is prepared using a precoding matrix computed based on inverse-DFT (IDFT) vectors corresponding to the selected beams for the subset of the plurality of UEs.

2. The method of claim 1, further comprising:
    computing, for each of the plurality of UEs, a channel matrix by performing SRS-based downlink channel estimations based on the received SRS, wherein the channel matrix is between an antenna array for the UE and an antenna array for the base station;
    estimating, for each of the plurality of UEs, strengths or signal-to-noise ratios (SNRs) of a plurality of pre-determined beams for the UE by performing a two-dimensional discrete Fourier transform (2D-DFT) on the computed channel matrix; and
    selecting, for each of the plurality of UEs, the one or more beams among the plurality of pre-determined beams based on the estimated strengths.

3. The method of claim 2, wherein an SRS-based downlink channel estimation is an SRS-based least squares channel estimation.

4. The method of claim 2, wherein the estimated strengths or SNRs of the selected one or more beams are also sent to the DU.

5. The method of claim 4, wherein the DU selects the subset of the plurality of UEs based on the strengths or SNRs of the selected one or more beams.

6. The method of claim 5, further comprising sending channel quality indicators (CQIs) received from the plurality of UEs to the DU.

7. The method of claim 6, wherein the DU selects the subset of the plurality of UEs further based on the CQIs.

8. The method of claim 7, wherein the DU selects the subset of the plurality of UEs further based on downlink traffic information associated with each of the plurality of UEs.

9. The method of claim 8, wherein the downlink traffic information associated with a UE comprises traffic class type, hybrid automatic repeat request (HARQ) retransmission information, and any pre-scheduled persistent or semi-persistent transmission allocations.

10. The method of claim 1, wherein each of the beams to be associated with the UEs in the subset corresponds to a discrete Fourier transform (DFT) vector.

11. The method of claim 10, wherein the pre-coded multi-user data is created based on a precoding matrix for the RBG.

12. The method of claim 10, wherein the precoding matrix for the RBG is computed by:
   establishing a maMIMO channel matrix by calculating inverse-DFT (IDFT) vectors of the DFT vectors corresponding to the beams to be associated with the UEs in the subset;
   calculating a regularized pseudo-inverse of the maMIMO channel matrix; and
   normalizing power of each column of the regularized pseudo-inverse of the maMIMO channel matrix such that a transmit power level for each UE in the selected subset equals to each other.

13. The method of claim 12, wherein calculating an IDFT vector of a DTF vector is calculating a complex conjugate of the DFT vector.

14. One or more computer-readable non-transitory storage media embodying software that is operable when executed, by a computing device associated with a base station of a wireless network, to:
   receive, from a plurality of user equipments (UEs) associated with the base station, sounding reference signal (SRS);
   send, to a distributed unit (DU) associated with the base station, information regarding one or more beams selected for each of the plurality of UEs based on the received SRS;
   receive, from the DU, information regarding a subset of the plurality of UEs selected for downlink data transmissions for a resource block group (RBG), multi-user data to be transmitted to UEs in the subset, and identities of beams to be associated with the UEs in the subset; and
   transmit pre-coded multi-user data to the UEs in the subset for the RBG using Multiple-Input Multiple-Output (MIMO) technologies, wherein the pre-coded multi-user data is prepared using a precoding matrix computed based on inverse-DFT (IDFT) vectors corresponding to the selected beams for the subset of the plurality of UEs.

15. The media of claim 14, wherein the software is further operable when executed to:
   compute, for each of the plurality of UEs, a channel matrix by performing SRS-based downlink channel estimations based on the received SRS, wherein the channel matrix is between an antenna array for the UE and an antenna array for the base station;
   estimate, for each of the plurality of UEs, strengths or signal-to-noise ratios (SNRs) of a plurality of pre-determined beams for the UE by performing a two-dimensional discrete Fourier transform (2D-DFT) on the computed channel matrix; and
   select, for each of the plurality of UEs, the one or more beams among the plurality of pre-determined beams based on the estimated strengths.

16. The media of claim 15, wherein an SRS-based downlink channel estimation is an SRS-based least squares channel estimation.

17. The media of claim 15, wherein the estimated strengths or SNRs of the selected one or more beams are also sent to the DU.

18. The media of claim 17, wherein the DU selects the subset of the plurality of UEs based on the strengths or SNRs of the selected one or more beams.

19. The media of claim 18, wherein the SRS-based downlink channel estimation is an SRS-based least squares channel estimation.

20. A computing device associated with a base station of a wireless network comprising:
   one or more processors; and
   one or more computer-readable non-transitory storage media coupled to one or more of the processors and comprising instructions operable when executed by one or more of the processors to cause the system to:
   receive, from a plurality of user equipments (UEs) associated with the base station, sounding reference signal (SRS);
   send, to a distributed unit (DU) associated with the base station, information regarding one or more beams selected for each of the plurality of UEs based on the received SRS;
   receive, from the DU, information regarding a subset of the plurality of UEs selected for downlink data transmissions for a resource block group (RBG), multi-user data to be transmitted to UEs in the subset, and identities of beams to be associated with the UEs in the subset; and
   transmit pre-coded multi-user data to the UEs in the subset for the RBG using Multiple-Input Multiple-Output (MIMO) technologies, wherein the pre-coded multi-user data is prepared using a precoding matrix computed based on inverse-DFT (IDFT) vectors corresponding to the selected beams for the subset of the plurality of UEs.

* * * * *